United States Patent
Mukuda et al.

(10) Patent No.: US 7,935,772 B2
(45) Date of Patent: May 3, 2011

(54) WATER-BASED RESIN COMPOSITION, WEATHER RESISTANCE IMPROVER FOR WATER-BASED PAINT USING THE SAME, WEATHER RESISTANCE IMPROVER FOR THERMOPLASTIC RESIN, AND WEATHER RESISTANCE IMPROVER FOR SOLVENT-BASED PAINT

(75) Inventors: Takahiro Mukuda, Toyohashi (JP); Masaaki Kiura, Toyohashi (JP); Motomi Tanaka, Toyohashi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 550 days.

(21) Appl. No.: 11/915,485

(22) PCT Filed: May 26, 2006

(86) PCT No.: PCT/JP2006/310569
§ 371 (c)(1),
(2), (4) Date: Jan. 9, 2008

(87) PCT Pub. No.: WO2006/126680
PCT Pub. Date: Nov. 30, 2006

(65) Prior Publication Data
US 2009/0105419 A1    Apr. 23, 2009

(30) Foreign Application Priority Data

| May 26, 2005 | (JP) | 2005-154109 |
| Jul. 25, 2005 | (JP) | 2005-214830 |
| Dec. 12, 2005 | (JP) | 2005-357925 |
| Mar. 1, 2006 | (JP) | 2006-054806 |
| Mar. 7, 2006 | (JP) | 2006-061447 |
| Mar. 7, 2006 | (JP) | 2006-061496 |

(51) Int. Cl.
*C08F 26/06* (2006.01)
(52) U.S. Cl. .......... 526/265; 524/801; 524/808
(58) Field of Classification Search .......... 526/265; 524/801, 808
See application file for complete search history.

(56) References Cited

U.S. PATENT DOCUMENTS

| 5,534,579 | A | * | 7/1996 | Nikaya et al. ......... 524/460 |
| 2003/0045637 | A1 | * | 3/2003 | Hoshida et al. ......... 525/165 |

FOREIGN PATENT DOCUMENTS

| EP | 1 106 661 A2 | 6/2001 |
| JP | 3-46506 | 7/1991 |
| JP | 8-188694 | 7/1996 |
| JP | 8-193180 | 7/1996 |
| JP | 2637574 | 4/1997 |
| JP | 2000-186116 | 7/2000 |
| JP | 2001-49151 | 2/2001 |
| JP | 2002-155116 | 5/2002 |
| JP | 2002-194266 | 7/2002 |
| JP | 2002-234917 | 8/2002 |
| JP | 2002-302638 | 10/2002 |
| JP | 2003-40937 | 2/2003 |
| JP | 2003-55598 | 2/2003 |
| JP | 2003-96261 | 4/2003 |
| JP | 2003-253194 | 9/2003 |
| JP | 2004-10805 | 1/2004 |
| JP | 2004-161782 | 6/2004 |
| JP | 2004-352848 | 12/2004 |

OTHER PUBLICATIONS

U.S. Appl. No. 12/515,972, filed May 22, 2009, Kiura, et al.

* cited by examiner

*Primary Examiner* — Edward J Cain
(74) *Attorney, Agent, or Firm* — Oblon, Spivak, McClelland, Maier & Neustadt, L.L.P.

(57) ABSTRACT

Disclosed is a water-based resin composition containing a copolymer (A) which is obtained by carrying out emulsion polymerization of an unsaturated monomer composed of 0.5 to 50 parts by mass of a specific ethylenically unsaturated monomer (a) having a piperidyl group in a molecule and 50 to 99.5 parts by mass of an ethylenically unsaturated monomer (b), which does not substantially contain an ethylenically unsaturated monomer having a specific functional group in a molecule, with the total of the ethylenically unsaturated monomers (a) and (b) being 100 parts by mass, under the coexistence of 0.1 to 10 parts by mass of an emulsifier. Also disclosed are a weather resistance improver for water-based paints using the foregoing water-based resin composition, a weather resistance improver for thermoplastic resins, and a weather resistance improver for solvent-based paints.

16 Claims, No Drawings

WATER-BASED RESIN COMPOSITION, WEATHER RESISTANCE IMPROVER FOR WATER-BASED PAINT USING THE SAME, WEATHER RESISTANCE IMPROVER FOR THERMOPLASTIC RESIN, AND WEATHER RESISTANCE IMPROVER FOR SOLVENT-BASED PAINT

TECHNICAL FIELD

The present invention relates to a water-based resin composition. Specifically, the present invention relates to a water-based paint, which is excellent in weather resistance, using the water-based resin composition. Further, the present invention relates to a weather resistance improver for a water-based paint using the water-based resin composition, which can sharply improve weather resistance when added to the water-based paint. Furthermore, the present invention relates to a weather resistance improver for a thermoplastic resin and a weather resistance improver for a solvent-based paint, both of which use a resin composition recovered from the water-based resin composition, and these improvers can sharply improve weather resistance when added to the thermoplastic resin and the solvent-based paint, respectively.

BACKGROUND ART

In recent years, there is a strong demand in improving durability of polymer materials which are used under severe circumstances such as outdoors from the viewpoints of reducing maintenance cost and reducing environmental load by saving resources.

Among them, in the field of a paint, it is intended to change from a solvent-based paint which uses an organic solvent as a medium to a water-based paint which uses water as a dispersing medium, and the use of the water-based paint is rapidly expanding. Consequently, demands for the performance of the water-based paint have become high degree, and water-based paints having high-degree weather resistance have been proposed.

For example, there is a description, in Patent Document 1, that a paint, which is made by copolymerizing an ultraviolet light absorber (hereinafter, expressed as a "reactive UVA") having an unsaturated double bond, in a molecule, capable of radical polymerization, with a polymerizable monomer having a highly hydrophobic cyclohexyl group, having excellent weather resistance for a long time without showing the bleed out of the UVA component from the coating film can be obtained.

In Patent Document 2, there is a description that a paint, which is made by copolymerizing a hindered amine type light stabilizer (hereinafter, expressed as a "reactive HALS") having an unsaturated double bond in a molecule and a polymerizable monomer having a highly hydrophobic cyclohexyl group, having excellent weather resistance for a long time without showing the bleed out of the HALS component from the coating film can be obtained.

Further, in Patent Document 3, there is a description that a paint composed of an emulsion obtained by copolymerizing a reactive HALS at the last stage of a multistage emulsion polymerization in the presence of a silane coupling agent having a cyclohexyl group is excellent in compatibility and film formability, and excellent weather resistance for a long time can be obtained.

Further, in the field of a water-based paint, investigations concerning a weather resistance improver have been carried out to improve only weather resistance of a water-based paint with relatively low weather resistance, which has been conventionally used, without changing physical properties of the water-based paint. However, as to the water-based paint, there has been a problem, in stability of quality of the water-based paint, in which, for example, the weather resistance improver comes to bleed with time on the upper layer when the weather resistance improver is added because the main medium of the water-based paint is water. Further, there has been a problem that the water-based paint does not realize sufficient performance even in the case of forming a film using the water-based paint right after it is stirred because it is difficult to homogeneously disperse the weather resistance improver.

As countermeasures to these problems, in Patent Document 4, a technology has been proposed, in which a nonreactive UVA or a nonreactive HALS which does not have an unsaturated double bond in a molecule is previously dispersed in water using an emulsifier and then the resultant dispersion is added to the water-based paint to improve weather resistance of the water-based paint.

Further, in the field of a thermoplastic resin to be used for automobiles and building materials, a weather resistance improver such as HALS, UVA, or an antioxidant in accordance with characteristics of each thermoplastic resin has been proposed. However, in the case of the weather resistance improver having relatively low molecular mass, it is difficult to maintain capability for improving weather resistance for a long time owing to bleed out of the weather resistance improver with time, which results in concentration lowering of the weather resistance improver in a base material. To solve such a problem, a polymer type weather resistance improver has been proposed. In Patent Document 5, a technology of improving weather resistance of a thermoplastic resin has been proposed, in which a reactive UVA and a reactive HALS are copolymerized in high concentration in an organic solvent and the resultant mixture is reprecipitated in a poor solvent to recover the polymer type weather resistance improver which is then compounded into the thermoplastic resin.

Patent Document 1: Japanese Patent Application Laid-Open No. Hei 8-198,130
Patent Document 2: Japanese Patent No. 2,637,574
Patent Document 3: Japanese Patent Application Laid-Open No. 2004-10,805
Patent Document 4: Japanese Patent Publication No. Hei 3-46,506
Patent Document 5: Japanese Patent Application Laid-Open No. 2003-40,937

DISCLOSURE OF INVENTION

Problem to be Solved by the Invention

However, when these proposals were evaluated from the viewpoint of a water-based paint having high-degree weather resistance, a water-based paint with insufficient weather resistance, the value of which was about 4,000 hours in terms of the value obtained by an accelerated test of a sunshine weatherometer, was merely obtained according to the method of Patent Document 1. Further, according to the method of Patent Document 2, the emulsifier to be used was restricted because the polymerization stability is degraded owing to the occurrence of emulsion polymerization of an unsaturated monomer containing an acidic functional group (hereinafter, expressed as an "acid component") and the reactive HALS at the same polymerization stage. Further, in this case, radical scavenging capability of a HALS component was lowered by the acid component, because the acid component was copolymerized, and hence weather resistance of the water-based paint thus obtained was insufficient. According to the method of Patent Document 3, the acid component was first copolymerized in the inside, then neutralized, and then the reactive HALS was copolymerized at the final stage so that polymerization stability was excellent, however, weather resistance of the water-based paint thus obtained was insufficient for the same reason as in the case of Patent Document 2 owing to the copolymerized acid component.

Further, when these proposals were evaluated from the viewpoint of a weather resistance improver for water-based paints, according to the method of Patent Document 4, it was difficult to maintain weather resistance of a coating film for a long time because bleed out of a weather resistance improver with time from the coating film occurred owing to low molecular mass of the weather resistance improver. Further, when an emulsion obtained by the method of Patent Document 3 was used as a weather resistance improver, capability for improving weather resistance of the weather resistance improver was insufficient because diffusibility of the HALS component at the time of film forming was low and radical scavenging capability of the HALS component was lowered, owing to mutual interaction of the acid component and the HALS component in an emulsion particle.

Further, when these proposals were evaluated from the viewpoint of a weather resistance improver for thermoplastic resins, according to the method of Patent Document 4, the weather resistance improver was produced by extremely complicated method, in which the weather resistance improver was recovered by reprecipitation after solution polymerization, which caused problems in industrial production. Further, there remained a very small amount of an organic solvent in the recovered material, which caused a problem in the use where control of high-degree odor level was required.

The present invention has been made in view of the above-mentioned circumstances and a purpose of the present invention is to provide a water-based resin which can be used not only as a water-based paint having high-degree weather resistance but also, when added to another water-based paint, as a weather resistance improver which can drastically improve the weather resistance of the other water-based paint to which the weather resistance improver has been added.

Further, another purpose of the present invention is to provide a weather resistance improver which, when added to various thermoplastic resins and solvent-based paints, can improve their weather resistance.

Means for Solving the Problem

One aspect of the present invention resides in a water-based resin composition containing a copolymer (A) which is obtained by carrying out emulsion polymerization of an unsaturated monomer composed of 0.5 to 50 parts by mass of an ethylenically unsaturated monomer (a), represented by the following general formula (I), having a piperidyl group in a molecule and 50 to 99.5 parts by mass of an ethylenically unsaturated monomer (b), which does not substantially contain an ethylenically unsaturated monomer having a functional group represented by the following formula (II), (III), or (IV) in a molecule, with the total of the unethylenically unsaturated monomers (a) and (b) being 100 parts by mass, under the coexistence of 0.1 to 10 parts by mass of an emulsifier,

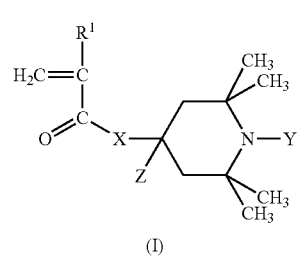

wherein $R^1$ represents a hydrogen atom or an alkyl group having 1 to 2 carbon atoms, X represents an oxygen atom or an imino group, Y represents a hydrogen atom or an alkyl or alkoxyl group having 1 to 20 carbon atoms, and Z represents a hydrogen atom or a cyano group.

—COOH  (II)

—SO₃H  (III)

—PO₃H  (IV)

Another aspect of the present invention resides in a weather resistance improver for water-based paints and a water-based paint both of which contain the foregoing water-based resin composition.

Another aspect of the present invention resides in a resin composition obtained by recovering solid matter in the foregoing water-based resin composition.

Another aspect of the present invention resides in a weather resistance improver for thermoplastic resins and a weather resistance improver for solvent-based paints both of which include the foregoing resin composition.

BEST MODE FOR CARRYING OUT THE INVENTION

The water-based resin composition of the present invention needs to be the one in which the content of an ethylenically unsaturated monomer (a) represented by the general formula (I) is 0.5 to 50 parts by mass, provided that the total amount of the unsaturated monomers at the time of polymerization is 100 parts by mass. When the content of the ethylenically unsaturated monomer (a) is 0.5 parts by mass or more, weather resistance of a coating film obtained by using the water-based resin composition alone as a water-based paint is largely improved. Further, the content of the ethylenically unsaturated monomer (a) needs to be 50 parts by mass or less from the viewpoints of polymerization stability and storage stability. Further, the content of the ethylenically unsaturated monomer (a) is preferably 6 to 50 parts by mass in the use in which high-degree pigment dispersibility or designability such as matt is required as a coating film. When the content of the ethylenically unsaturated monomer (a) is within this range, pigment dispersibility and resin-beads dispersibility can be improved and hence excellent finish can be obtained in the uses of clear paints and paints with various pigments.

Further, when the water-based resin composition of the present invention is used as a weather resistance improver which is added to another water-based paint to improve its weather resistance, the content of the ethylenically unsaturated monomer (a) is preferably 6 to 50 parts by mass, provided that the total amount of the unsaturated monomers at the time of polymerization is 100 parts by mass, from the viewpoints of compatibility with a polymer which constitutes the other water-based paint to which the weather resistance improver for water-based paints is added and realization of weather resistance of a coating film. When the content of the ethylenically unsaturated monomer (a) is within this range, the weather resistance of the water-based paint can be largely improved without any large changes in physical properties of paint and physical properties of coating film of the water-based paint obtained by adding a small amount of the weather resistance improver for water-based paints. The content of the ethylenically unsaturated monomer (a) is more preferably 20 to 50 parts by mass.

Further, when solid matter is recovered from the water-based resin composition of the present invention and used also as a weather resistance improver for thermoplastic resins, the content of the ethylenically unsaturated monomer (a) is preferably 6 to 50 parts by mass, provided that the total amount of the unsaturated monomers is 100 parts by mass. When the content of the ethylenically unsaturated monomer (a) is within this range, the weather resistance of a thermoplastic resin can be largely improved without any large changes in physical properties and moldability of the thermoplastic resin by adding a small amount of the weather resistance improver for thermoplastic resins to the thermoplastic resin. The amount of use of the ethylenically unsaturated monomer (a) is more preferably 20 to 50 parts by mass.

Further, when solid matter is recovered from the water-based resin composition of the present invention and also used also as a weather resistance improver for solvent-based paints, the content of the ethylenically unsaturated monomer (a) is preferably 6 to 50 parts by mass, provided that the total amount of the unsaturated monomers is 100 parts by mass. When the content of the ethylenically unsaturated monomer (a) is within this range, the weather resistance of a solvent-based paint can be largely improved without any large changes in physical properties of the solvent-based paint and physical properties of the coating film by adding a small amount of the weather resistance improver for solvent-based paints to the solvent-based paint. The amount of use of the ethylenically unsaturated monomer (a) is more preferably 20 to 50 parts by mass.

As the ethylenically unsaturated monomer (a), the one having a stabilizing function for ultraviolet light can be used, and for example, 4-(meth)acryloyloxy-2,2,6,6-tetramethyl piperidine, 4-(meth)acryloylamino-2,2,6,6-tetramethylpiperidine, 4-(meth)acryloyloxy-1,2,2,6,6-pentamethyl piperidine, 4-(meth)acryloylamino-1,2,2,6,6-pentamethylpiperidine, or 4-cyano-4-(meth)acryloyloxy-2,2,6,6-tetramethylpiperidine can be listed.

These monomers can be used alone or in combination of two or more kinds when it is needed. When a methacrylate monomer in which $R^1$ in the general formula (I) is a methyl group is used alone or in combination of two or more kinds as the ethylenically unsaturated monomer (a), a drastic improving effect on weather resistance can be obtained in the case that the water-based resin composition of the present invention is used as the weather resistance improver for water-based paints, and, therefore, the methacrylate is preferable.

An ethylenically unsaturated monomer (b) is the one which does not substantially contain an ethylenically unsaturated monomer having an acidic functional group represented by the formula (II), (III), or (IV) in a molecule (hereinafter, expressed as an "acid monomer"). The expression "does not substantially contain an ethylenically unsaturated monomer" means that the content of the ethylenically unsaturated monomer is less than 0.1%. When the ethylenically unsaturated monomer (b) does not substantially contain the acid monomer, stability of emulsion polymerization is largely improved. Further, lowering of diffusibility and radical scavenging capability of a HALS component caused by mutual interaction of the acidic functional group and the HALS component in a coating film can be suppressed.

As the ethylenically unsaturated monomer (b), for example, an alkyl (meth)acrylate having an alkyl group with 1 to 12 carbon atoms such as methyl (meth)acrylate, ethyl (meth)acrylate, n-propyl (meth)acrylate, i-propyl (meth)acrylate, n-butyl (meth)acrylate, i-butyl (meth)acrylate, sec-butyl (meth)acrylate, t-butyl acrylate, n-amyl (meth)acrylate, i-amyl (meth)acrylate, n-hexyl (meth)acrylate, 2-ethylhexyl (meth)acrylate, n-octyl (meth)acrylate, nonyl (meth)acrylate, decyl (meth)acrylate, dodecyl (meth)acrylate, lauryl (meth)acrylate, or stearyl (meth)acrylate; a cycloalkyl (meth)acrylate such as cycloalkyl (meth)acrylate or p-t-butylcyclohexyl (meth)acrylate; a radical polymerizable monomer containing hydroxyl group such as 2-hydroxyethyl (meth)acrylate, 2-(3-)hydroxypropyl (meth)acrylate, 4-hydroxybutyl (meth)acrylate, or glycerol mono(meth)acrylate; a polymerizable monomer containing a nitrogen atom such as (meth)acrylamide, N,N-dimethylaminoethyl (meth)acrylate, vinylpyridine, or vinylimidazol; a halogen containing monomer such as vinyl chloride, vinylidene chloride, vinyl fluoride, vinylidene fluoride, or tetrafluoroethylene; an aromatic monomer such as styrene, α-methylstyrene, or vinyltoluene; a vinyl ester such as vinylacetate; a vinyl ether; or a polymerizable cyano compound such as (meth)acrylonitrile can be used. The foregoing ethylenically unsaturated monomer (b) can be used alone or in combination of two or more kinds.

When the water-based resin composition of the present invention is used as a water-based paint, a (meth)acrylate type unsaturated monomer is preferably used from the viewpoint of weather resistance of the water-based resin.

Further, when the water-based resin composition of the present invention is used as a weather resistance improver for water-based paints, it is most preferable to use main monomers, which give the water-based paints, alone or in combination of two or more kinds, in accordance with the water-based paints to which the weather resistance improver is added from the viewpoint of maintaining various characteristics of the water-based paints. Among them, it is preferable to use a (meth)acrylate type unsaturated monomer from the viewpoint of improving weather resistance of the water-based paints containing the weather resistance improver for water-based paints of the present invention.

Further, when a resin composition obtained by recovering solid matter from the water-based resin composition of the present invention is used as a weather resistance improver for thermoplastic resins or a weather resistance improver for solvent-based paints, it is preferable to use main monomers, which constitute the thermoplastic resins or the solvent-based paints, alone or in combination of two or more kinds, in accordance with the kinds of the thermoplastic resins or the solvent-based paints to which the weather resistance improver is added from the viewpoint of improving various characteristics of the thermoplastic resins or the solvent-based paints.

When the water-based resin composition of the present invention is used as a water-based paint, a weather resistance improver for water-based paints, a weather resistance improver for thermoplastic resins or a weather resistance improver for solvent-based paints, deterioration of a resin and a HALS component can be suppressed and weather resistance or capability for improving weather resistance can be improved in any of the above uses, in the case that an unsaturated monomer having an ultraviolet light absorbing group represented by the following general formula (V), (VI), or (VII) in a molecule (hereinafter, expressed as a "reactive UVA") is used as one component of the ethylenically unsaturated monomer (b).

However, when a large amount of the reactive UVA is copolymerized, there is a case that polymerization stability in an emulsion polymerization is lowered or that transparency of a coating film is lowered. Consequently, when the reactive UVA is used as one component of the ethylenically unsaturated monomer (b), it is preferable that the reactive UVA be copolymerized in an optimum range in accordance with the use of the water-based resin composition of the present invention.

For example, when the water-based resin composition of the present invention is used as the water-based paint, the amount of the reactive UVA is preferably 2 parts by mass or less to 100 parts by mass of the total amount of the unsaturated monomers at the time of polymerization. When the amount of the reactive UVA is 2 parts by mass or less, yellowness of a coating film is low and a coating film realizing high-degree weather resistance can be obtained. Further, when the water-based resin composition of the present invention is used as a weather resistance improver for water-based paints or a weather resistance improver for solvent-based paints, the amount of the reactive UVA is preferably within the range of from 5 to 20 parts by mass, provided that the total amount of the unsaturated monomers at the time of polymerization is 100 parts by mass. When the amount of the reactive UVA is 5 parts by mass or more, sufficient effects on absorbing ultraviolet light and on improving weather resistance of the paint to which the water-based resin composition has been added can be obtained with a small amount of addition of the water-based resin composition, without changing various properties of the paint. Further, when the amount of the reactive UVA is 20 parts by mass or less, polymerization stability can be secured, and moreover, coloring of the coating film of the paint to which the water-based resin composition has been added can be evaded.

In the case that the reactive UVA is copolymerized within the above range and the resultant water-based resin composition of the present invention is used as the weather resistance improver for water-based paints, mass average molecular mass (Mw) of the copolymer (A) is particularly preferably within the range of from 5,000 to 300,000. When the mass average molecular mass (Mw) is 300,000 or less, diffusibility of the UVA component is improved and coloring property of the coating film is further improved in the course of forming films of the water-based paints to which the weather resistance improver for water-based paints of the present invention is added. When the mass average molecular mass (Mw) is 5,000 or more, bleed out of the UVA component from the coating film can be suppressed and capability for improving weather resistance for a long time can be given. The most preferable mass average molecular mass of the copolymer (A) is from 5,000 to 200,000.

Further, in the case that a resin composition obtained by recovering powder of the water-based resin composition of the present invention is used as the weather resistance improver for thermoplastic resins, the amount of the reactive UVA is preferably 20 parts by mass or less, provided that the total amount of the unsaturated monomers at the time of polymerization is 100 parts by mass. When the amount of the reactive UVA is 20 parts by mass or less, sufficient polymerization stability can be obtained.

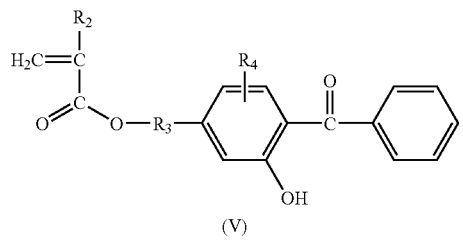

[Formula V]

(V)

In the Formula (V), $R^2$ represents a hydrogen atom or an alkyl group having 1 to 2 carbon atoms, $R^3$ represents a linear or a branched hydrocarbon substituted group having 1 to 15 carbon atoms or a hydrocarbon substituted group having a cyclic structure, and $R^4$ represents a linear or a branched hydrocarbon substituted group having 1 to 25 carbon atoms or a hydrocarbon group having a cyclic structure.

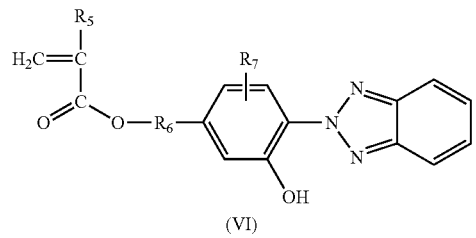

[Formula VI]

(VI)

In the Formula (VI), $R^5$ represents a hydrogen atom or an alkyl group having 1 to 2 carbon atoms, $R^6$ represents a linear or a branched hydrocarbon substituted group having 1 to 15 carbon atoms or a hydrocarbon substituted group having a cyclic structure, and $R^7$ represents a linear or a branched hydrocarbon substituted group having 1 to 25 carbon atoms or a hydrocarbon group having a cyclic structure.

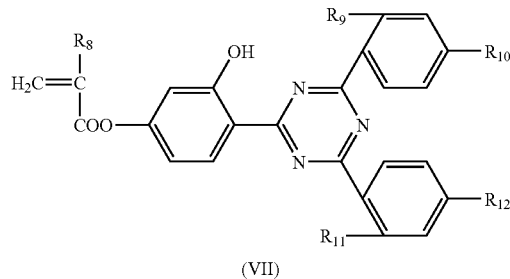

[Formula VII]

(VII)

In the Formula (VIII), $R^8$ represents a hydrogen atom or a methyl group, and $R^9$ to $R^{12}$ independently represent a hydrogen atom or a linear alkyl group having 1 to 10 carbon atoms, respectively.

The water-based resin composition of the present invention has to be subjected to emulsion polymerization in the presence of 0.1 to 10 parts by mass of an emulsifier to 100 parts by mass of the total amount of the unsaturated monomers at the time of polymerization. When the amount of the emulsifier is 0.1 parts by mass or more, polymerization stability and mechanical stability are improved. Further, when the amount of the emulsifier is 10 parts by mass or less, water resistance of a coating film is not lowered in the case that the water-based resin composition of the present invention is used as a water-based paint or a weather resistance improver for water-based paints. When 6 parts by mass or more of the reactive HALS is polymerized, the amount of the emulsifier is preferably 1 part by mass or more in point of polymerization stability. Further, in order to give further high-degree water resistance to the coating film, the amount of the emulsifier to be used is preferably 8 parts by mass or less.

As the emulsifiers to be used, conventionally known various anion or nonion emulsifiers, or polymer emulsifiers, or the like can be listed. Further, when a reactive emulsifier having a radical polymerizable unsaturated double bond in a molecule is used, higher-degree water resistance and weather resistance can be given to the coating film in the case that the water-based resin composition of the present invention is used as a water-based paint or a weather resistance improver for water-based paints.

In the case that furthermore higher-degree water resistance and weather resistance is desired to be given, it is preferable to use a reactive anion emulsifier as the emulsifier. Further, in the case of the use in which, in particular, high mechanical stability is needed, it is more preferable to jointly use a reactive anion emulsifier and a reactive nonion emulsifier. Further, in the case of the jointly using, the ratio of the reactive anion emulsifier to the reactive nonion emulsifier is particularly preferably 8/2 to 2/8 (mass ratio). The unsaturated monomer of the present invention does not contain the reactive emulsifier.

As the nonreactive emulsifier, an anion emulsifier such as "Newcol 560SF", "Newcol 562SF", "Newcol 707SF", "Newcol 707SN", "Newcol 714SF", "Newcol 723SF", "Newcol 740SF", "Newcol 2308SF", "Newcol 2320SN", "Newcol 1305SN", "Newcol 271A", "Newcol 271 NH", "Newcol 210", "Newcol 220", "Newcol RA331", or "Newcol RA332" (each one is a trade name and manufactured by Nippon Nyukazai Co., Ltd.), "Latemul B-118E", "Levenol WZ", or "Neopelex GI 5" (each one is a trade name and manufactured by Kao Corporation), or "Hightenol N08" (a trade name and manufactured by Dai-ichi Kogyo Seiyaku Co., Ltd.), or an anion emulsifier such as "Nonipol 200" or "Newpol PE-68" (each one is a trade name and manufactured by Sanyo Chemical Industries, Ltd.) can be listed.

As the polymer emulsifier, for example, polyvinyl alcohol, polyhydroxyethyl (meth)acrylate, polyhydroxypropyl (meth)acrylate, or poly(vinylpyrrolidone) can be listed.

As the reactive emulsifier, for example, a reactive anion emulsifier such as "Antox MS-60" or "Antox MS-2N" (each one is a trade name and manufactured by Nippon Nyukazai Co., Ltd.), "Eleminol JS-2" (a trade name and manufactured by Sanyo Chemical Industries, Ltd.), "Latemul S-120", "Latemul S-180", "Latemul S-180A", or "Latemul PD-104" (each one is a trade name and manufactured by Kao Corporation), "Adeka Reasoap SR-10" or "Adeka Reasoap SE-10" (each one is a trade name and manufactured by Asahi Denka Kogyo K.K.), "Aquaron KH-05", "Aquaron KH-10", or "Aquaron HS-10" (each one is a trade name and manufactured by Dai-ichi Kogyo Seiyaku Co., Ltd.), or a reactive nonion emulsifier such as "Adeka Reasoap NE-10", "Adeka Reasoap ER-10", "Adeka Reasoap NE-20", "Adeka Reasoap ER-20", "Adeka Reasoap NE-30", "Adeka Reasoap ER-30", "Adeka Reasoap NE-40", or "Adeka Reasoap ER-40" (each one is a trade name and manufactured by Asahi Denka Kogyo K.K.), or "Aquaron RN-10", "Aquaron RN-20", "Aquaron RN-30", or "Aquaron RN-50" (each one is a trade name and manufactured by Dai-ichi Kogyo Seiyaku Co., Ltd.) can be listed. They can be used alone or in combination of two or more kinds when it is needed.

When a monomer having a functional group with capability of radical trapping in its side chain such as the ethylenically unsaturated monomer (a) is subjected to emulsion polymerization, the resulting copolymer (A) forms a crosslinked structure, in the case that the concentration of the ethylenically unsaturated monomer (a) exceeds a certain amount. The water-based resin composition of the present invention may have a crosslinked structure or a noncrosslinked structure, however, it has preferably a noncrosslinked structure or a low-crosslinked structure, and particularly preferably a noncrosslinked structure. This is because, when the water-based resin composition of the present invention alone is used as a water-based paint, for example, film formability is improved and, as a result, water resistance and weather resistance of the coating film are improved, though it depends on coating conditions in the case that the copolymer (A) has the noncrosslinked structure or the low-crosslinked structure.

In the case that the water-based resin composition of the present invention is used as a weather resistance improver for water-based paints or in the case that a resin composition recovered from the water-based resin composition is used as a weather resistance improver for thermoplastic resins, improving effect on weather resistance can be realized in a wider range of water-based paints or thermoplastic resins because diffusibility of a HALS component to the resin to which the HALS component is added is improved by making the water-based resin composition or the resin composition have a noncrosslinked structure or a low-crosslinked structure. Further, it is preferable for a weather resistance improver for solvent-based paints to have a noncrosslinked structure.

As a measure for making the copolymer (A) to a polymer having a low-crosslinked structure or a noncrosslinked structure, polymerization under the coexistence of a chain transfer agent is also effective as well as a method of increasing the amount of an initiator. Among them, in the case of the water-based resin composition of the present invention, it is preferable to carry out emulsion polymerization of the unsaturated monomers in the presence of 0.1 to 10 parts by mass of the chain transfer agent to 100 parts by mass of the total amount of the unsaturated monomers at the time of polymerization. When the amount of the chain transfer agent is 0.1 parts by mass or more, crosslinking density can be lowered. When the amount of the chain transfer agent exceeds 10 parts by mass, it is not preferable because a large amount of the unreacted chain transfer agent remains in the polymer thus obtained and Mw is drastically lowered. The more preferable range of the amount of the chain transfer agent is 0.1 to 5 parts by mass in point of resistance to bleed out and weather resistance.

As the chain transfer agent, a publicly known chain transfer agent like a mercaptan-based chain transfer agent such as n-dodecyl mercaptan, t-dodecyl mercaptan, n-octyl mercaptan, n-tetradecyl mercaptan, n-hexyl mercaptan, or n-butyl mercaptan; a halogen compound such as tetrachlorocarbon, or bromoethylene; a disulfide compound such as diphenyl disulfide; or α-methylstyrene dimer can be used. These agents can be used alone or in combination of two or more kinds.

Further, mass average molecular mass (hereinafter, expressed as "Mw") of the copolymer (A) constituting the water-based resin composition of the present invention is not particularly limited, however, it is preferably within the range of from 5,000 to 300,000 in accordance with the use of the water-based resin composition of the present invention. For example, when the present water-based resin composition is used as a weather resistance improver for water-based paints, capability for improving weather resistance can be realized in more kinds of water-based paints, provided that Mw of the copolymer (A) is within this range. When the Mw of the copolymer (A) is 5,000 or more, bleed out of the copolymer (A) from the coating film obtained by forming a water-based paint containing the weather resistance improver for water-based paints of the present invention into a film can be suppressed and a weather resistance over a long period of time can be held. When the Mw of the copolymer (A) is 300,000 or less, diffusibility of the HALS component in a film forming process is improved in the case that the weather resistance improver for water-based paints of the present invention is added to water-based paints in a wide range, and as a result, capability for improving weather resistance of the weather resistance improver for water-based paints and weather resistance of the coating film composed of the water-based paint to which the weather resistance improver is added are improved.

Further, when solid matter is recovered from the water-based resin composition of the present invention and used as a weather resistance improver for thermoplastic resins or a weather resistance improver for solvent-based paints, the Mw of the copolymer (A) is preferably within the range of from 5,000 to 300,000 because of the same reason as [that] in the case of the weather resistance improver for water-based paints.

Further, when the water-based resin composition of the present invention alone is used alone as a water-based paint, the Mw of the copolymer (A) is preferably 20,000 or more, and more preferably within the range of from 20,000 to 300,000. When the Mw of the copolymer (A) is 20,000 or more, weather resistance of the coating film can maintain sufficient weather resistance. When the Mw of the copolymer (A) is 300,000 or less, film formability is further improved and high water resistance and weather resistance can be obtained. When the water-based resin composition of the present invention is used as the water-based paint, the more preferable Mw of the copolymer (A) is within the range of from 50,000 to 300,000.

Further, when the water-based resin composition of the present invention is used as the water-based paint and the weather resistance improver for water-based paints, the minimum film forming temperature (hereinafter, expressed as "MFT") measured by the method according to "JIS K 6828 5.11" is preferably 70° C. or below. When the MFT is exceeding 70° C., there is a case that film formability is inferior when the water-based resin composition is used as the water-based paint, and sufficient water resistance and weather resistance cannot be obtained with regard to the resultant coating film. Further, when the water-based resin composition is used as the weather resistance improver for water-based paints, it is apprehended that sufficient diffusibility of the HALS component cannot be obtained in the course of a film forming process of the water-based paint containing the weather resistance improver for water-based paints of the present invention, and weather resistance cannot be sufficiently improved with regard to the resultant coating film. The most preferable MFT is 50° C. or below.

Further, the glass transition temperature (hereinafter, expressed as "Tg") of the copolymer (A) which constitutes the water-based resin composition of the present invention is not particularly limited, however, it is preferable to change the Tg in accordance with the use of the water-based resin composition. For example, in the case that the water-based resin composition of the present invention is used as a water-based paint and a weather resistance improver for water-based paints or a weather resistance improver for solvent-based paints, the Tg of the copolymer (A) is preferably 100° C. or below. When the Tg of the copolymer (A) is 100° C. or below, the water-based paint containing the water-based resin composition of the present invention has good film formability and does not lower water resistance or weather resistance of the resultant coating film. The Tg of the copolymer (A) is preferably 70° C. or below, and more preferably 50° C. or below. Further, in the case that the water-based resin composition of the present invention is used as a weather resistance improver for thermoplastic resins, the Tg of the copolymer (A) is preferably 50° C. or above. When the Tg of the copolymer (A) is 50° C. or above, it becomes easy to maintain the primary particle structure of solid matter at the time of recovering the solid matter, and good dispersibility of the weather resistance improver for thermoplastic resins into the thermoplastic resins can be secured. The Tg of the copolymer (A) is more preferably 70° C. or above. In the case that the water-based resin composition of the present invention is used as a weather resistance improver for thermoplastic resins, it is particularly preferable that a multistage polymerization be adopted at the time of emulsion polymerization and a copolymer having a high Tg be formed at the outermost layer in point of powder characteristics. As the foregoing Tg, a calculated glass transition temperature obtained by the Fox equation is used. The Fox equation is a relation equation of a glass transition temperature (° C.) of a copolymer and glass transition temperatures (° C.) of homopolymers obtained by independently homopolymerizing respective comonomers of the copolymer as shown below.

$$1/(273+Tg)=\Sigma(Wi/(273+Tgi))$$

(in the above equation, Wi represents a mass ratio of a monomer i and Tgi represents a Tg (° C.) of a homopolymer of the monomer i.)

As the Tg of each homopolymer, concretely, the values described in "Polymer Handbook 3rd Edition" (Wiley-Interscience Publication, 1989) can be used.

The water-based resin composition of the present invention can be produced, for example, by emulsion polymerization with a radical polymerization initiator using the ethylenically unsaturated monomer (a), the ethylenically unsaturated monomer (b), and an emulsifier in a water medium. The particle structure of the copolymer (A) constituting the water-based resin composition of the present invention may be a monolayered structure or a multilayered structure, however, in the case of the multilayered structure, a three-layered structure or less is preferable from the viewpoints of production efficiency and particle diameter control. Further, in the case of the multilayered structure, it may be carried out, for example, to polymerize the ethylenically unsaturated monomer (b) in the first step and then polymerize the mixture of the ethylenically unsaturated monomer (a) and the ethylenically unsaturated monomer (b) in the second step or later or to polymerize the mixture of the ethylenically unsaturated monomers (a) and (b) in the first step and then polymerize the ethylenically unsaturated monomer (b) in the second step or later. It may be carried out to polymerize a mixture containing these two monomers in the first step and then polymerize a mixture containing these two monomers in a different ratio in the second step or later. In these cases, the concentration of the ethylenically unsaturated monomer (a) in each step is preferably 50 parts by mass or less, provided that the total amount of the monomers in respective steps is 100 parts by mass. When the concentration of the ethylenically unsaturated monomer (a) exceeds 50 parts by mass in each step, polymerization stability of the step is lowered, and it is not preferable.

As the polymerization initiator for polymerizing the water-based resin composition of the present invention, the one to be generally used in a radical polymerization can be used, a concrete example of which includes a persulfate such as potassium persulfate, sodium persulfate, or ammonium persulfate; an oil-soluble azo compound such as azobisisobutyronitrile, 2,2'-azobis(2-methyl butyronitrile), 2,2'-azobis(2,4-dimethylvaleronitrile), 2,2'-azobis(4-methoxy-2,4-dimethylvaleronitrile), or 2-phenylazo-4-methoxy-2,4-dimethylvaleronitrile; a water-soluble azo compound such as 2,2'-azobis{2-methyl-N-[1,1-bis(hydroxymethyl)-2-hydroxyethyl]propionamide}, 2,2'-azobis{2-methyl-N-[2-(1-hydroxyethyl)]propionamide}, 2,2'-azobis{2-methyl-N-[2-(1-hydroxybutyl)]propionamide}, 2,2'-azobis[2-(5-methyl-2-imidazolin-2-il)propane] or its salt, 2,2'-azobis[2-(2-imidazolin-2-il)propane] or its salt, 2,2'-azobis[2-(3,4,5,6-tetrahydropyrimidine-2-il)propane] or its salt, 2,2'-azobis{2-[1-(2-hydroxyethyl)-2-imidazolin-2-il]propane} or its salt, 2,2'-azobis(2-methylpropionamidine) or its salt, 2,2'-azobis(2-methylpropinamidine) or its salt, or 2,2'-azobis[N-(2-carboxyethyl)-2-methylpropionamidine] or its salt; or an organic peroxide such as benzoyl peroxide, cumene hydroperoxide, t-butyl hydroperoxide, t-butyl peroxy-2-ethylhexanoate, or t-butyl peroxyisobutylate can be listed. These initiators can be used alone or in combination of two or more kinds. Further, when promotion of polymerization speed or polymerization at low temperature, namely 70° C. or below, is desired, it is advantageous to jointly use a reducing agent, for example, sodium bisulfite, ferrous sulfate, or an ascorbate and a radical polymerization catalyst. The amount of addition of the radical polymerization initiator is usually within the range of from 0.01 to 10 parts by mass to the total amount of ethylenically unsaturated monomers, and is particularly preferably 0.05 to 5 parts by mass in consideration of progress of the polymerization or control of the reaction.

Further, the particle diameter of the polymer particle constituting the water-based resin composition of the present invention is not particularly limited, however, it is preferable to select the optimum particle diameter in accordance with the use of the water-based resin composition of the present invention. As an average particle diameter, the one of cumulant analysis obtained by the measurement at 25° C. of the sample which was adjusted to 1% concentration, using "Fiber-Optics Particle Analyzer with Autosampler FPAR-1000" manufactured by Otsuka Electronics Co., Ltd. was adopted.

For example, in the case that the water-based resin composition of the present invention alone is used as a water-based paint, the average particle diameter is preferably in the range of from 30 to 200 nm. When the average particle diameter is 30 nm or more, polymerization stability is improved and hence the amount of an emulsifier to be used, which may be an important factor of lowering of water resistance of the coating film, can be reduced. When the average particle diameter is 200 nm or less, film formability of the water-based paint is improved and hence various physical properties such as water resistance and weather resistance of the coating film are improved. Further, in the case that the water-based resin composition of the present invention is used as a weather resistance improver for water-based paints, the average particle diameter is preferably in the range of from 30 to 300 nm. When the average particle diameter is 300 nm or less, diffusibility of the weather resistance improver for water-based paints of the present invention into the coating film is improved and hence high-degree improving performance of weather resistance can be obtained owing to the HALS component diffused in the coating film. As the average particle diameter, it is more preferably 170 nm or less, and particularly preferably 140 nm or less. Further, the average particle diameter is preferably 30 nm or more in order to prevent lowering of water resistance of the coating film caused by an increase in the emulsifier. Further, in the case that a resin composition obtained by recovering solid matter in the water-based resin composition of the present invention is used as a weather resistance improver for thermoplastic resins or a weather resistance improver for solvent-based paints, the average particle diameter is preferably 30 nm or more. When the average particle diameter is 30 nm or more, polymerization stability is improved.

The solid matter concentration (hereinafter, expressed as "NV") of the water-based resin composition of the present invention is not particularly limited, however, it is preferably within the range of from 30 to 70 parts by mass. In the case that the water-based resin composition of the present invention is used as a water-based paint, sufficient film formability can be obtained and hence appearance of the coating film is excellent, provided that the NV is 30 parts by mass or more. Further, in the case that the water-based resin composition of the present invention is used as a weather resistance improver for water-based paints, physical properties of paint of the water-based paint to which the weather resistance improver for water-based paints has been added can be maintained. Further, recovery efficiency of the solid matter in the recovery step of the solid matter in the case of using the water-based resin composition of the present invention as a weather resistance improver for thermoplastic resins or a weather resistance improver for solvent-based paints becomes sufficient. Further, when the NV is 70 parts by mass or less, excellent polymerization stability can be obtained.

As for the emulsion obtained by emulsion polymerization, stability of the emulsion can be raised by adjusting the pH of the emulsion to become weak alkalinic, namely within the range of from about 7.5 to 10.0, by adding a basic compound after the polymerization. As the basic compound, for example, ammonia, triethylamine, propylamine, dibutylamine, amylamine, 1-aminooctane, 2-(dimethylamino)ethanol, ethylaminoethanol, 2-(diethylamino)ethanol, 1-amino-2-propanol, 2-amino-1-propanol, 2-amino-2-methyl-1-propanol, 3-amino-1-propanol, 1-dimethylamino-2-propanol, 3-dimethylamino-1-propanol, 2-(propylamino)ethanol, ethoxypropylamine, aminobenzyl alcohol, morphorin, sodium hydroxide, or potassium hydroxide can be listed. It is preferable to use an inorganic basic compound in the case of the use such as an interior which is desired not to contain VOC. Further, in the case where even a faint odor is not desired, it is preferable to use a nonvolatile inorganic basic compound such as sodium hydroxide or potassium hydroxide.

In the case that the water-based resin composition of the present invention is used as a water-based paint, one kind of the water-based paint having the same composition alone or a mixture of two or more kinds of the water-based paints having different compositions may be used. In order to realize high-degree performances of the water-based paint of the present invention, various pigments, a film-forming aid, a defoaming agent, a pigment dispersing agent, a leveling agent, an anti-sagging agent, a matting agent, a nonreactive HALS, a nonreactive ultraviolet light absorber, an antioxidant, a heat resistance improver, a slip agent, a viscosity control agent, an antiseptic agent, and the like may be added. Further, the water-based paint of the present invention may be used after mixed with a melamine-based hardening agent, an epoxy-based hardening agent, or an isocyanate-based hardening agent of emulsion type, water-soluble resin type, low molecular mass type, or the like. In order to form coating films on surfaces of various materials using the water-based paint containing the weather resistance improver for water-based paints of the present invention, for example, a publicly known coating method such as a spray coating method, a roller coating method, a bar coating method, an air-knife coating method, a brush coating method, or a dipping method may be properly selected and carried out.

The amount of addition of the weather resistance improver for water-based paints in the case that the water-based resin composition of the present invention is used as the weather resistance improver for water-based paints is not particularly limited, however, it is preferably 1 to 50% by mass as solid matter, provided that the sum of solid matter of the weather resistance improver for water-based paints and solid matter of the water-based paint to which the weather resistance improver for water-based paints has been added is 100% by mass. When the concentration of the weather resistance improver for water-based paints of the present invention is less than 1% by mass, there is a case that sufficient capability for improving weather resistance of the coating film cannot be realized because the concentration of the ethylenically unsaturated monomer (a) in the coating film becomes low even if the concentration of the ethylenically unsaturated monomer (a) in the copolymer (A) which constitutes the weather resistance improver for water-based paints is sufficiently raised. Further, when the concentration of the weather resistance improver for water-based paints of the present invention is exceeding 50% by mass, the characteristics of the water-based paint containing the weather resistance improver for water-based paints of the present invention tends to be lowered. Further, as the weather resistance improver for water-based paints of the present invention, one kind of a resin having a same composition alone or a combination of two or more kinds of resins having different compositions may be used.

The weather resistance improver for water-based paints of the present invention can be used for various water-based paints such as an acrylic paint, an acryl-silicone paint, a polyester paint, an urethane paint, a fluorine paint, a vinyl chloride paint and an alkyd paint. Further, in order to realize high-degree performances of the weather resistance improver for water-based paints of the present invention and the water-based paint containing it, various pigments, a film-forming aid, a defoaming agent, a pigment dispersing agent, a leveling agent, an anti-sagging agent, a matting agent, a nonreactive HALS, a nonreactive ultraviolet light absorber, an antioxidant, a heat resistance improver, a slip agent, an antiseptic agent, and the like may be added. These additives may be added to a mixture obtained after the weather resistance improver for water-based paints of the present invention is added to the water-based paint or to the water-based paint existing before the weather resistance improver for water-based paints is added to the water-based paint. Further, after these additives are added to the weather resistance improver for water-based paints of the present invention, the resultant weather resistance improver for water-based paints containing these additives may be added to the water-based paint.

In order to form coating films on surfaces of various materials using the water-based paint containing the weather resistance improver for water-based paints of the present invention, a publicly known coating method such as a spray coating method, a roller coating method, a bar coating method, an air-knife coating method, a brush coating method, or a dipping method may be properly selected and carried out.

In the case that a resin composition obtained by recovering solid matter in the water-based resin composition of the present invention is used as a weather resistance improver for thermoplastic resins, one kind of a resin having a same composition alone or a combination of two or more kinds of resins having different compositions may be used. When the combination of two or more kinds of resins is used, the solid matter may be recovered after the two or more kinds of resins have been mixed or the respective resin compositions obtained by separately recovering the solid matter may be mixed to use.

As a method for recovering the solid matter, a publicly known method such as a spray-drying method, a coagulation method or a centrifugation method may be used, and it is preferable that the solid matter be recovered by the spray-drying method or the coagulation method. As the method for recovering the solid matter using the spray-drying method, a method in which a water-based resin composition obtained by emulsion polymerization is spray-dried and recovered as powder with a spray dryer under the conditions of an inlet temperature of 120 to 220° C. and an outlet temperature of 40 to 90° C. can be adopted. The outlet temperature is preferably 40 to 80° C. in point of disintegrability of a recovered secondary particle to a primary particle, and particularly preferably 40 to 70° C.

Further, as the method for recovering the solid matter using the coagulation method, a method in which a water-based resin composition is contacted with a coagulating agent at 30 to 60° C., coagulated while stirred to make a slurry, and the slurry is dehydrated and dried to recover powder can be adopted. As the coagulating agent, for example, an inorganic acid such as hydrochloric acid, sulfuric acid, nitric acid or phosphoric acid, an organic acid such as formic acid or acetic acid, or an organic salt such as aluminum sulfate, magnesium sulfate, calcium acetate or calcium sulfate can be listed.

The weather resistance improver for thermoplastic resins of the present invention can be used for thermoplastic resins such as an acrylic resin, a vinyl chloride resin, a polyethylene resin, a polypropylene resin, a polystyrene resin, an ABS resin, a polyamide resin, a polyester resin and a polycarbonate resin, and the amount of addition can be changed in accordance with a target weather resistance. The weather resistance improver for thermoplastic resins of the present invention can be molded together with the thermoplastic resin to which it is added by a publicly known molding method such as an injection molding method, an extrusion molding method, a blow molding method, a press molding method, a calendering method, or an inflation molding method.

The amount of addition of the weather resistance improver for thermoplastic resins of the present invention is not particularly limited, however, it is preferably 0.1 to 50% by mass to 100% by mass of the sum of the weather resistance improver for thermoplastic resins and the thermoplastic resin. When the amount of addition is less than 0.1% by mass, sufficient capability for improving weather resistance tends to be lowered. Further, when the amount of addition is exceeding 50% by mass, the characteristics of the thermoplastic resin to which the weather resistance improver for thermoplastic resins is added tends to be lowered. In order to realize high-degree performances of the weather resistance improver for thermoplastic resins of the present invention and the thermoplastic resin containing it, a mold release agent, various kinds of pigments, a dye, a flame retardant, an ultraviolet light absorber, an antioxidant, an antiseptic agent, an anti-fungus agent, and the like may be added.

In the case that a resin composition obtained by recovering solid matter in the water-based resin composition of the present invention is used as a weather resistance improver for solvent-based paints, the amount of addition of the weather resistance improver for solvent-based paints is not particularly limited, however, it is preferably within the range of from 1 to 50% by mass, provided that 100% by mass of the sum of the solid matter of the weather resistance improver for solvent-based paints and the solvent-based paint is 100% by mass. When the concentration of the weather resistance improver for solvent-based paints of the present invention is 1% by mass or more, weather resistance of the solvent-based paint to which the weather resistance improver for solvent-based paints has been added is largely improved, and when the concentration of the weather resistance improver for solvent-based paints of the present invention is 50% by mass or less, its effect on the physical properties of the solvent-based paint to which the weather resistance improver for solvent-based paints has been added becomes limitative. Further, as the weather resistance improver for solvent-based paints of the present invention, one kind of a resin having a same composition alone or a combination of two or more kinds of resins having different compositions may be used. The weather resistance improver for solvent-based paints of the present invention can be used for various solvent-based paints such as an acrylic paint, an acryl-silicone paint, a polyester paint, a urethane paint, a fluorine paint, a vinyl chloride paint and an alkyd paint.

The kind of the solvent-based paint may be a thermoplastic paint or a thermosetting paint. Further, in order to realize high-degree performances of the weather resistance improver for solvent-based paints of the present invention and the solvent-based paint containing it, a brightening agent such as aluminum paste or mica; a coloring agent such as titanium oxide, carbon black or quinacridone; a pigment dispersing agent; a hardening agent such as isocyanate, epoxy or melamine; a leveling agent; an anti-sagging agent; a matting agent; a nonreactive HALS; a nonreactive ultraviolet light absorber; a slip agent; or the like may be added. These additives may be added to a mixture obtained after the weather resistance improver for solvent-based paints of the present invention is added to the solvent-based paint or to the solvent-based paint existing before the weather resistance improver for solvent-based paints is added. Further, after these additives are added to the weather resistance improver for solvent-based paints of the present invention, the resultant weather resistance improver for solvent-based paints containing these additives may be added to the solvent-based paint.

In order to form coating films on surfaces of various materials using the solvent-based paint containing the weather resistance improver for solvent-based paints of the present invention, a publicly known coating method such as a spray coating method, a roller coating method, a bar coating method, an air-knife coating method, a brush painting coating method, or a dipping method may be properly selected and carried out to obtain a dried coating film thickness of about 10 to 200 μm.

In the case that the water-based resin composition of the present invention is used as a water-based paint, solid matter content is not particularly limited, however, it is usually used within the range of from 20 to 80% by mass. Further, in this case, one kind of a water-based resin composition having a same composition alone or a combination of two or more kinds of water-based resin compositions having different compositions may be used. In order to realize high-degree performances of the water-based paint of the present invention, various pigments, a film-forming aid, a defoaming agent, a pigment dispersing agent, a leveling agent, an anti-sagging agent, a matting agent, a nonreactive HALS, a nonreactive ultraviolet light absorber, an antioxidant, a heat resistance improver, a slip agent, a viscosity control agent, an antiseptic agent, and the like may be added. Further, the water-based paint of the present invention may be used after mixed with a melamine-based hardening agent, an epoxy-based hardening agent, or an isocyanate-based hardening agent of emulsion type, water-soluble resin type, low molecular mass type, or the like. In order to form coating films on surfaces of various materials using the water-based paint containing the weather resistance improver for water-based paints of the present invention, for example, a publicly known coating method such as a spray coating method, a roller coating method, a bar coating method, an air-knife coating method, a brush coating method, or a dipping method may be properly selected and carried out.

EXAMPLES

Hereinafter, the present invention will be explained in more detail by examples in accordance with the uses, however, the present invention is not limited to these examples. In the following description, "part(s)" is expressed in terms of mass basis.

Use as a Water-Based Paint

Various evaluations of the water-based paint were carried out by the following methods.

(Minimum Film Forming Temperature (MFT))

MFT of a water-based resin composition was measured for 3 g of the sample by a method according to "JIS K 6828 5.11" using a minimum film forming temperature measuring device manufactured by Takabayashi Rika Co.

(Viscosity)

The value of viscosity of a water-based resin composition measured at 25° C. using "R-100 viscometer" manufactured by Toki Sangyo Co., Ltd. was adopted.

(Average Particle Diameter)

An average particle diameter of cumulant analysis of a resin composition adjusted to 1% concentration, obtained by the measurement at 25° C. using "Fiber-Optics Particle Analyzer with Autosampler FPAR-1000" manufactured by Otsuka Electronics Co., Ltd. was adopted.

(Mechanical Stability Test)

Using Maron mechanical stability tester, 100 g of a water-based resin composition was tested for 10 minutes under the shear of 15 Kg, and the tested sample was filtrated with a 100 mesh nylon screen, and the amount of residue was measured and evaluated by the following standard.

"⊚": The amount of residue is less than 0.01 g or almost not seen.

"○": The amount of residue is 0.01 g or more and less than 0.1 g.

"Δ": The amount of residue is 0.1 g or more and less than 0.5 g.

"x": The amount of residue is 0.5 g or more, or gelation occurs during the test.

(Storage Stability)

To a bottle of mayonnaise, 200 g of a water-based resin composition was introduced, and the bottle thus packed was placed in a thermostatic water bath kept at 50° C. for one week. Subsequently, the water-based resin composition was taken out and [coagulation] coagulated substance and viscosity were confirmed and evaluated by the following standard.

"○": There is no coagulated substance and change rate of viscosity is less than ±20%.

"○Δ": There is no coagulated substance and change rate of viscosity is ±20% or more and less than ±30%.

"Δ": There is no coagulated substance and change rate of viscosity is ±30% or more.

"x": Coagulated substance is observed.

(Polymerization Stability)

Cullet formed during polymerization was gathered by filtration using a nylon screen and dried in a dryer at 50° C. for 24 hours, and the dried material was weighed and evaluated by the following standard.

"⊚": The amount of cullet in the dried state is less than 100 ppm.

"○": The amount of cullet in the dried state is 100 ppm or more and less than 300 ppm.

"○Δ": The amount of cullet in the dried state is 300 ppm or more and less than 1,000 ppm.

"Δ": The amount of cullet in the dried state is 1,000 ppm or more, but polymerization can be carried out.

"x" Polymerization cannot be carried out because of instability of a system.

(Mass Average Molecular Mass (Mw))

To a sample bottle, 0.1 g of a water-based resin composition was introduced, 10 g of tetrahydrofuran (THF) was added and the resultant mixture was kept overnight at a room temperature. The sample solution thus prepared was measured under the following conditions using "HCL-8120" manufactured by Tosoh Corporation to obtain mass average molecular mass (Mw). In the case that a peak was not detected after the retention time exceeded 20 minutes, it was concluded that the sample solution had become insoluble owing to formation of a crosslinked structure.

Column: TSK-gel; TSL-gel; Super HM-M×4 pieces (6.0 mm I.D.×15 cmL)
Eluent: THF
Flow rate: 0.6 ml/min
Injection amount: 20 μl
Column temperature: 40° C.
Detector: differential refractive index detector (RI)

The test in the case of using the water-based resin composition of the present invention as a water-based paint was carried out according to the following method.

<Preparation of a Clear Paint>

To 100 g of a water-based resin composition, "CS-12" (trade name, manufactured by Chisso Corporation, film forming aid) was added to the extent that the minimum film forming temperature of the water-based resin composition became 5° C., and 0.5 g of "RHEOLATE350" (trade name, manufactured by Rheox Inc., thickener) and 0.5 g of "Surfynol DF-58" (trade name, manufactured by Air Products and Chemicals, Inc., defoaming agent) were further added, and the mixture was sufficiently stirred and filtrated using a 100 mesh nylon screen to obtain a clear paint for weather resistance evaluation.

<Preparation of a White Enamel Paint>

"TIPAQUE CR-97" (trade name, manufactured by Ishihara Sangyo Kaisha, Ltd., titanium oxide made by chloride process): 707 g, "ADEKA COL W-193" (trade name, manufactured by Asahi Dennka Kogyo K.K., pigment dispersing agent): 12 g, Surfynol DF-58 (trade name, manufactured by Air Products and Chemicals, Inc., defoaming agent): 25 g, and deionized water 256 g were sufficiently mixed, and glass beads were added to the mixture and the pigment was dispersed for 30 minutes using a high-speed disperser, and then the glass beads and the like were filtrated with a 300 mesh nylon screen to obtain a mill base for evaluation (solid content: 71% by mass).

Subsequently, to 100 g of a water-based resin composition (solid content: 46% by mass), "CS-12" (trade name, manufactured by Chisso Corporation, film forming aid) was added to the extent that the minimum film forming temperature of the water-based resin composition became 5° C., and 42.7 g of the foregoing mill base and 0.5 g of "RHEOLATE350" (trade name, manufactured by Rheox Inc., thickener) were added in this order, and the resultant mixture was sufficiently stirred, and adjusted to have the viscosity of about 30 seconds in terms of "Ford Cup #4" by adding deionized water. Subsequently, the resultant mixture was filtrated again with a 300 mesh nylon screen to obtain a white enamel paint for evaluation having 40% of PWC.

<Silica-Dispersion Test>

To 100 g of a water-based resin composition, "CS-12" (trade name, manufactured by Chisso Corporation, film forming aid) was added to the extent that the minimum film forming temperature of the water-based resin composition became 5° C., and 10 g of "SP seal H" (trade name, manufactured by Kaleido Co., silica matting agent), 0.5 g of "RHEOLATE350" (trade name, manufactured by Rheox Inc., thickener) and 0.5 g of "Surfynol DF-58" (trade name, manufactured by Air Products and Chemicals, Inc., defoaming agent) were further added, and the mixture was sufficiently stirred and filtrated using a 100 mesh nylon screen to obtain a paint for silica-dispersibility evaluation. This clear paint for evaluation was coated on a steel plate treated with zinc phosphate treatment (steel plate treated with "Bondelite #100", thickness: 0.8 mm, 70 mm×150 mm) by spray coating to the extent that the thickness of the dried coating film became 30 μm, and kept at a room temperature for 1 hour and subjected to forced drying at 80° C. for 1 hour to obtain a coated plate for silica-dispersibility evaluation. Using a value of gloss at 20 degrees of this test plate as an index, the following standard was applied for evaluation.

The gloss at 20 degrees was measured using polarized light glossmeter "VG-2000" (trade name) manufactured by Nippon Denshoku Industries Co., Ltd.

"A": less than 5
"B": 5 or more and less than 10
"C": 10 or more

<Hot Water Resistance Test>

A glass plate was coated with a clear paint using a 8 mil applicator, and dried at a room temperature for 1 hour and subjected to forced drying at 80° C. for 1 hour to obtain a coated plate for evaluation of hot water resistance. Subsequently, the coated plate was soaked in water at 50° C. for 1 week. Whitening, swelling and occurrence of blister right after the plate was taken out were checked and judged according to the following standard.

"⊚": No change is observed.
"○": A little blue-whitening is observed, but swelling and peeling are not observed.
"○Δ": Whitening is observed, but swelling and peeling are not observed.
"Δ": Conspicuous whitening, or swelling and peeling is observed.
"x": Conspicuous whitening, swelling, and peeling are observed.

<Weather Resistance Test for Clearness>

The clear paint for evaluation was coated on a steel plate treated with zinc phosphate treatment (steel plate treated with "Bondelite #100", thickness: 0.8 mm, 70 mm×150 mm) by spray coating to the extent that the thickness of the dried coating film became 30 μm, and kept at a room temperature for 1 hour and subjected to forced drying at 80° C. for 1 hour to obtain a coated plate for evaluation of weather resistance for clearness. This coated plate was cut to plates each having the size of 70 mm×50 mm, and the resultant plates were put in "Daipla Metal Weather KU-R4-W" (trade name, manufactured by Daipla Wintes Co., Ltd.) and tested under the conditions of test cycle: 4 hours of irradiation and 4 hours of moisture condensation; UV strength: 85 mW/cm$^2$; black panel temperature: 63° C. at irradiation and 30° C. at moisture condensation; and humidity: 50% RH at irradiation and 96% RH at moisture condensation, respectively. Using retentions of gloss at 60 degrees of the test plates after elapse of 2,000 hours and 3,000 hours as indexes, the following standard was applied for evaluation. The gloss at 60 degrees was measured using polarized light glossmeter "VG-2000" (trade name) manufactured by Nippon Denshoku Industries Co., Ltd.
"⊚": 85% or more
"○": 70% or more and less tan 85%
"○Δ" 55% or more and less than 70%
"Δ": 40% or more and less than 55%
"x": less than 40%<
<Pigment Dispersibility>

The white enamel paint for evaluation was coated on a steel plate treated with zinc phosphate treatment (steel plate treated with "Bondelite #100", thickness: 0.8 mm, 70 mm×150 mm) by spray coating to the extent that the thickness of the dried coating film became 50 μm, and kept at a room temperature for 1 hour and subjected to forced drying at 80° C. for 1 hour to obtain a coated plate for evaluation of pigment dispersibility. Using a value of gloss at 60 degrees of this test plate as an index, the following standard was applied for evaluation.

The gloss at 60 degrees was measured using polarized light glossmeter "VG-2000" (trade name) manufactured by Nippon Denshoku Industries Co. Ltd.
"A": 75 or more
"B": 50 or more and less than 75
"C": less than 50
<Weather Resistance Test for Enamel Coating>

The white enamel paint for evaluation was coated on a steel plate treated with zinc phosphate treatment (steel plate treated with "Bondelite #100", thickness: 0.8 mm, 70 mm×150 mm) by spray coating to the extent that the thickness of the dried coating film became 50 μm, and kept at a room temperature for 1 hour and subjected to forced drying at 80° C. for 1 hour to obtain a coated plate for evaluation of weather resistance for enamel coating. This coated plate was cut to a plate having the size of 70 mm×50 mm, and the resultant plate was put in "Daipla Metal Weather KU-R4-W" (trade name, manufactured by Daipla Wintes Co., Ltd.) and tested under the conditions of test cycle: 4 hours of irradiation and 4 hours of moisture condensation; UV strength: 85 MW/cm$^2$; black panel temperature: 63° C. at irradiation and 30° C. at moisture condensation; and humidity: 50% RH at irradiation and 96% RH at moisture condensation. Using retention of gloss at 60 degrees of the test plate after elapse of 2,000 hours as an index, the following standard was applied for evaluation. The gloss at 60 degrees was measured using polarized light glossmeter "VG-2000" (trade name) manufactured by Nippon Denshoku Industries Co., Ltd.
"⊚": 90% or more
"○": 75% or more and less tan 90%
"○Δ": 60% or more and less than 75%
"Δ": 40% or more and less than 60%
"x": less than 40%

Example 1

To a reactor flask equipped with a stirrer, a condenser, a temperature control system, a dropping pump and a nitrogen-introducing tube, 45 parts of deionized water, 5% by mass of emulsion A compounded with the rate shown in Table 1 and 0.2 part of 28% by mass aqueous ammonia were introduced, and the resultant mixture was heated to 75° C. while inside of the reactor was replaced by nitrogen, and an initiator solution obtained by dissolving 0.1 part of ammonium persulfate (polymerization initiator) into 5 parts of water was added to form a seed particle. The temperature of the resultant solution was measured by a thermometer, and after an exothermic peak was observed, the remainder of the emulsion A was dropped by taking 4 hours at the inside temperature of 75° C., and the resultant system was aged for 2 hours at the same inside temperature of 75° C. to polymerize a monomer of the emulsion A and to form a copolymer (A).

Subsequently, the system was cooled, and 0.2 part of 28% by mass aqueous ammonia was added at a temperature of 60° C. or below to prepare a water-based resin composition. The results of evaluation of the water-based resin composition thus obtained are shown in Table 1.

Examples 2 to 10

Comparative Examples 1, 3, 4, 6 and 7

The same procedure as in Example 1 was carried out to prepare water-based coating materials using the emulsion A compounded with the rate shown in Tables 1 and 2. The results of evaluation are shown in Tables 1 and 2.

Comparative Examples 2 and 5

The same procedure as in Example 1 was carried out to start emulsion polymerization using the emulsion A compounded with the rate shown in Table 2, however, coagulated materials were generated at the stage when a seed particle was formed by adding the initiator solution obtained by dissolving 0.1 part of ammonium persulfate (polymerization initiator) into 5 parts of water, and stirring became difficult owing to coagulated materials generated in course of dropping of the remainder of the emulsion A, and hence the polymerization was stopped.

TABLE 1

|  |  |  |  | Example | | | | |
|---|---|---|---|---|---|---|---|---|
| Constituents | Raw materials | | Tg (° C.) of homopolymer | 1 | 2 | 3 | 4 | 5 |
| Emulsion (A) | Monomer (b) | n-BMA | 20 | 99.5 | 94 | 94 | 80 | 50 |
|  |  | AA | 106 | — | — | — | — | — |
|  |  | UVA1 |  | — | — | — | — | — |
|  |  | Total |  | 99.5 | 94 | 94 | 80 | 50 |
|  | Monomer (a) | HALS1 |  | 0.5 | — | — | — | — |
|  |  | HALS2 |  | — | 6 | 6 | 20 | 50 |
|  |  | Total |  | 0.5 | 6 | 6 | 20 | 50 |
|  | Emulsifier | Adeka Reasoap SR-10 |  | 2 | 0.5 | 1 | 3 | 5 |
|  |  | Adeka Reasoap ER-30 |  | — | — | — | — | 2.5 |
|  | Chain transfer agent | NDM |  | — | — | — | — | — |
|  |  | Water |  | 52 | 50 | 51 | 53 | 58 |
| Water-based resin | Characteristic values | Concentration of monomer (a) in a copolymer | | 0.5 | 6 | 6 | 20 | 50 |
|  |  | Tg of monomer (b) in a copolymer (° C.) |  | 42 | 20 | 20 | 20 | 20 |
|  |  | MFT (° C.) |  | 65 | 40 | 42 | 42 | 60 |

TABLE 1-continued

| | | | | | | | |
|---|---|---|---|---|---|---|---|
| | | NV (% by mass) | 50 | 50 | 50 | 50 | 50 |
| | | Viscosity (mPaS) | 500 | 500 | 500 | 500 | 500 |
| | | PH | 9 | 9 | 9 | 9 | 9 |
| | | Average particle diameter of a | 130 | 130 | 130 | 130 | 130 |
| | Evaluation | Mass average molecular mass (Mw) | 300,000 | In-sol. | In-sol. | In-sol. | In-sol. |
| | results of | Mechanical stability | ○ | ○ | ○ | ○ | ◎ |
| | water-based | Storage stability | ◎ | ○ | ◎ | ◎ | ○ |
| | resin | Polymerization stability | ◎ | ○△ | ○ | ◎ | ○ |
| Evaluation results of coating film | Clear | Silica dispersibility | B | A | A | A | A |
| | | Initial gloss | 80 | 81 | 81 | 82 | 82 |
| | | Hot water weather resistance | ◎ | ◎ | ◎ | ◎ | ○ |
| | | Weather resistance (2,000 hr) | ○ | ◎ | ◎ | ◎ | ◎ |
| | | Weather resistance (3,000 hr) | ○△ | ○ | ○ | ◎ | ◎ |
| | Enamel | Pigment dispersibility | B | A | A | A | A |
| | | Weather resistance (2,000 hr) | ○ | ◎ | ◎ | ◎ | ◎ |

| | | | | Example | | | | |
|---|---|---|---|---|---|---|---|---|
| Constituents | | Raw materials | Tg (° C.) of homopolymer | 6 | 7 | 8 | 9 | 10 |
| Emulsion (A) | Monomer (b) | n-BMA | 20 | 50 | 80 | 50 | 80 | 93 |
| | | AA | 106 | — | — | — | — | — |
| | | UVA1 | | — | — | — | — | 1 |
| | | Total | | 50 | 80 | 50 | 80 | 93 |
| | Monomer (a) | HALS1 | | — | — | — | — | — |
| | | HALS2 | | 50 | 20 | 50 | 20 | 6 |
| | | Total | | 50 | 20 | 50 | 20 | 6 |
| | Emulsifier | Adeka Reasoap SR-10 | | 10 | 3 | 5 | 3 | 1 |
| | | Adeka Reasoap ER-30 | | — | 1 | 2.5 | — | — |
| | Chain transfer agent | NDM | | — | — | 1 | 0.6 | — |
| | | Water | | 60 | 54 | 59 | 54 | 51 |
| Water-based resin | Characteristic values | Concentration of monomer (a) in a copolymer (□) | | 50 | 20 | 50 | 20 | 6 |
| | | Tg of monomer (b) in a copolymer (° C.) | | 20 | 20 | 20 | 20 | 20 |
| | | MFT (° C.) | | 60 | 42 | 45 | 40 | 42 |
| | | NV (% by mass) | | 50 | 50 | 50 | 50 | 50 |
| | | Viscosity (mPaS) | | 500 | 500 | 500 | 500 | 500 |
| | | PH | | 9 | 9 | 9 | 9 | 9 |
| | | Average particle diameter of a | | 130 | 130 | 130 | 130 | 130 |
| | Evaluation results of water-based resin | Mass average molecular mass (Mw) | | In-sol. | In-sol. | In-sol. | 74,000 | In-sol. |
| | | Mechanical stability | | ○ | ◎ | ◎ | ○ | ○ |
| | | Storage stability | | ○ | ◎ | ◎ | ○ | ○ |
| | | Polymerization stability | | ○ | ◎ | ○ | ◎ | ○ |
| Evaluation results of coating film | Clear | Silica dispersibility | | A | A | A | A | A |
| | | Initial gloss | | 82 | 81 | 82 | 82 | 81 |
| | | Hot water weather resistance | | △ | ◎ | ◎ | ◎ | ◎ |
| | | Weather resistance (2,000 hr) | | ○ | ◎ | ◎ | ◎ | ◎ |
| | | Weather resistance (3,000 hr) | | ○ | ◎ | ◎ | ○ | ◎ |
| | Enamel | Pigment dispersibility | | A | A | A | A | A |
| | | Weather resistance (2,000 hr) | | ○ | ◎ | ◎ | ◎ | ◎ |

TABLE 2

| | | Tg(° C.) of | Comparative Example | | | | | | |
|---|---|---|---|---|---|---|---|---|---|
| Constituents | Raw materials | homopolymer | 1 | 2 | 3 | 4 | 5 | 6 | 7 |
| Emulsion (A) | | | | | | | | | |
| Monomer (b) | n-BMA | 20 | 77 | 77 | 99.9 | 30 | 80 | 50 | 98 |
| | AA | 106 | 3 | 3 | — | — | — | — | — |
| | UVA1 | | — | — | — | — | — | — | 2 |
| | Total | | 80 | 80 | 99.9 | 30 | 80 | 50 | 100 |

TABLE 2-continued

| Constituents | Raw materials | Tg(°C.) of homopolymer | Comparative Example | | | | | | |
|---|---|---|---|---|---|---|---|---|---|
| | | | 1 | 2 | 3 | 4 | 5 | 6 | 7 |
| Monomer (a) | HALS1 | | — | — | — | — | — | — | — |
| | HALS2 | | 0.5 | 20 | 0.1 | 70 | 20 | 50 | 0 |
| | Total | | 0.5 | 20 | 0.1 | 70 | 20 | 50 | 0 |
| Emulsifier | Adeka Reasoap SR-10 | | 3 | 3 | 2 | 3 | 0.05 | 5 | 2 |
| | Adeka Reasoap ER-30 | | 2 | 2 | — | — | — | 10 | — |
| Chain transfer agent | NDM | | — | — | — | — | — | — | — |
| | Water | | 55 | 55 | 52 | 53 | 50 | 65 | 52 |
| Water-based resin | | | | | | | | | |
| Characteristic values | Concentration of monomer (a) in a copolymer (□) | | 0.5 | 20 | 0.1 | 70 | 20 | 50 | 50 |
| | Tg of monomer (b) in a copolymer (°C.) | | 20 | 20 | 42 | 20 | 20 | 20 | 20 |
| | MFT (°C.) | | 35 | — | 65 | 90 | — | 60 | 60 |
| | NV (% by mass) | | 50 | — | 50 | 49 | — | 50 | 50 |
| | Viscosity (mPaS) | | 300 | — | 500 | 300 | — | 500 | 500 |
| | PH | | 9 | — | 9 | 9 | — | 9 | 9 |
| | Average particle diameter of a | | 170 | — | 130 | 170 | — | 130 | 130 |
| Evaluation results of water-based resin | Mass average molecular mass (Mw) | | 250,000 | — | 300,000 | In-sol. | — | In-sol. | 250,000 |
| | Mechanical stability | | ○ | — | ○ | Δ | — | ⊙ | ○ |
| | Storage stability | | Δ | — | ⊙ | × | — | ○ | ○ |
| | Polymerization stability | | Δ | × | ⊙ | Δ | × | ⊙ | ⊙ |
| Evaluation results of coating film | Clear | Silica dispersibility | A | — | C | A | — | A | C |
| | | Initial gloss | 78 | — | 80 | 60 | — | 82 | 80 |
| | | Hot water weather resistance | ○ | — | ⊙ | × | — | × | × |
| | | Weather resistance (2,000 hr) | Δ | — | × | × | — | Δ | Δ |
| | | Weather resistance (3,000 hr) | × | — | × | × | — | × | × |
| | Enamel | Pigment dispersibility | A | — | C | A | — | A | C |
| | | Weather resistance (2,000 hr) | × | — | × | × | — | ○ | × | n-BMA: Normal butyl methacrylate
AA: Acrylic acid
UVA1: [Formula VIII]

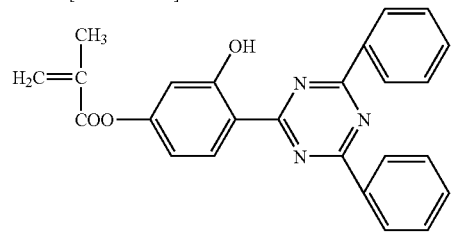

(VIII)

HALS1: 4-methacryloyloxy-2,2,6,6-tetramethylpiperidine
HALS2: 4-methacryloyloxy-1,2,2,6,6-pentamethylpiperidine
"Adeka Reasoap SR-10": reactive anion type surfactant (trade name, manufactured by Asahi Denka Kogyo K.K.)
"Adeka Reasoap ER-30": reactive nonion type surfactant (trade name, manufactured by Asahi Denka Kogyo K.K.)
NDM: Normal dodecyl mercaptan It is obvious from Tables 1 and 2 that the water-based paints of the present examples are excellent in weather resistance, silica dispersibility, hot water resistance, and pigment dispersibility as well as mechanical stability, storage stability and polymerization stability.

Contrary to this, the water-based paints of the comparative examples are inferior in polymerization stability or storage stability, and at least one characteristics of weather resistance, silica dispersibility, hot water resistance, and pigment dispersibility are insufficient, even if they are polymerizable. Consequently, it is obvious that the water-based paint having excellent polymerization stability, mechanical stability, and storage stability, and satisfying all the characteristics of weather resistance, silica dispersibility, hot water resistance and pigment dispersibility can be provided according to the present invention.

Use as a Weather Resistance Improver for Water-Based Paints

Various evaluations of the weather resistance improver for water-based paints were carried out according to the following methods.
<Preparation of a Clear Paint>

A water-based resin composition is compounded to a water-based paint of Reference Example 1 to be mentioned later with a fixed rate (shown in a table). To 100 g of the prepared water-based paint, "CS-12" (trade name, manufactured by Chisso Corporation, film forming aid) was added, as a film forming aid, to the extent that the minimum film forming temperature of the water-based paint became 5° C., and 0.5 g of "RHEOLATE350" (trade name, manufactured by Rheox Inc., thickener) and 0.5 g of "Surfynol DF-58" (trade name, manufactured by Air Products and Chemicals, Inc., defoaming agent) were further added, and the mixture was sufficiently stirred and filtrated using 100 mesh nylon screen to obtain a clear paint for evaluation. The resultant clear paint was coated on a steel plate treated with zinc phosphate treatment (steel plate treated with "Bondelite #100", thickness: 0.8 mm, 70 mm×150 mm) by spray coating to the extent that the thickness of the dried coating film became 50 μm, and kept at a room temperature for 1 hour and subjected to forced drying at 80° C. for 1 hour to obtain a coated plate for the tests of weather resistance and capability for improving weather resistance.

<Preparation of a White Enamel Paint>

"TIPAQUE CR-97" (trade name, manufactured by Ishihara Sangyo Kaisha, Ltd., titanium oxide made by chloride process): 707 g, "ADEKA COL W-193" (trade name, manufactured by Asahi Denka Kogyo K.K., pigment dispersing agent): 12 g, "Surfynol DF-58" (trade name, manufactured by Air Products and Chemicals, Inc., defoaming agent): 25 g, and deionized water 256 g were sufficiently mixed, and glass beads were added to the resultant mixture and dispersion of the pigment was carried out for 30 minutes using a high-speed disperser, and then the glass beads and the like were filtrated with 300 mesh nylon screen to obtain a mill base for evaluation (solid content: 71% by mass).

Subsequently, to 100 g of a water-based paint (solid content: 50% by mass) obtained by compounding a water-based resin composition to a water-based paint of Reference Example 1 to be mentioned later with a fixed rate (shown in a table), "CS-12" (trade name, manufactured by Chisso Corporation, film forming aid) was added, as a film forming aid, to the extent that the minimum film forming temperature of the water-based paint became 5° C., and 47 g of the foregoing mill base for evaluation and 0.5 g of "RHEOLATE350" (trade name, manufactured by Rheox Inc., thickener) were added in this order, and the resultant mixture was sufficiently stirred, and adjusted to have the viscosity of about 30 seconds in terms of "Ford Cup #4" by adding deionized water. Subsequently, the resultant mixture was filtrated again with a 300 mesh nylon screen to obtain a white enamel paint for evaluation having 40% of PWC. The resultant white enamel paint was coated on a steel plate treated with zinc phosphate treatment (steel plate treated with "Bondelite #100", thickness: 0.8 mm, 70 mm×150 mm) by spray coating to the extent that the thickness of the dried coating film became 50 μm, and kept at a room temperature for 1 hour and subjected to forced drying at 80° C. for 1 hour to obtain a coated plate for the tests of weather resistance, chalking, capability for improving weather resistance and pigment dispersibility.

<Weather Resistance Test>

The resultant coated plate for the test was put in a evaluation device "Daipla Metal Weather KU-R4-W" (manufactured by Daipla Wintes Co., Ltd.) and tested under the conditions of test cycle: 4 hours of irradiation and 4 hours of moisture condensation; UV strength: 85 mW/cm², black panel temperature: 63° C. at irradiation and 30° C. at moisture condensation; and humidity: 50% RH at irradiation and 96% RH at moisture condensation. Using retention of gloss at 60 degrees of the test plate after elapse of 2,000 hours as an index, the following standard was applied for evaluation. The gloss at 60 degrees was measured using polarized light glossmeter "VG-2000" manufactured by Nippon Denshoku Industries Co., Ltd.

"⊚": 80% or more
"○": 70% or more and less tan 80%
"○Δ": 60% or more and less than 70%
"Δ": 50% or more and less than 60%
"x": 30% or more and less than 50%
"xx": less than 30%<

<Water Resistance Test>

A glass plate was coated with a clear paint using a 8 mil applicator, and dried at a room temperature for 1 hour and subjected to forced drying at 80° C. for 1 hour to obtain a coated plate for evaluation of hot water resistance. Subsequently, the coated plate was soaked in water at a room temperature (about 20° C.) for 1 week. Whitening of coating film thus obtained right after the plate was taken out was checked by visual inspection and judged according to the following standard.

"○": No whitening is observed.
"Δ": Whitening is slightly observed.
"x": Conspicuous whitening is observed.

<Compatibility Test>

A glass plate was coated with a clear paint using a 8 mil applicator, and dried at a room temperature for 1 hour and subjected to forced drying at 80° C. for 1 hour to obtain a coated plate for evaluation of compatibility. The state of the coating film was checked by visual inspection and judged according to the following standard.

"○": No haze is observed.
"Δ" Haze is slightly observed.
"x": Conspicuous haze is observed.

<Chalking Test>

A state of chalking of a coating film after an accelerated test of 2,000 hours was evaluated by visual inspection and judged according to the following standard.

"○": No chalking is observed.
"Δ": Chalking is slightly observed.
"x": Conspicuous chalking is observed.

<Evaluation of Capability for Improving Weather Resistance>

Clear

"⊚"; In the evaluation of weather resistance, weather resistance of a coating film of a clear paint which contains the water-based resin composition is improved by 3 stages or more as compared with a coating film which does not contain the one.

"○": In the evaluation of weather resistance, weather resistance of the coating film of a clear paint which contains the water-based resin composition is improved by 2 stages as compared with a coating film which does not contain the one.

"Δ": In the evaluation of weather resistance, weather resistance of the coating film of a clear paint which contains the water-based resin composition is improved by 1 stage as compared with a coating film which does not contain the one.

"x": Weather resistance is not improved.

Enamel

"⊚": In the evaluation of weather resistance, weather resistance of a coating film of a white enamel paint which contains the water-based resin composition is improved by 3 stages or more as compared with a coating film which does not contain the one.

"○": In the evaluation of weather resistance, weather resistance of the coating film of a white enamel paint which contains the water-based resin composition is improved by 2 stages as compared with a coating film which does not contain the one.

"Δ": In the evaluation of weather resistance, weather resistance of the coating film of a white enamel paint which contains the water-based resin composition is improved by 1 stage as compared with a coating film which does not contain the one.

"x": Weather resistance is not improved.

<Pigment Dispersivity>

Using a value of gloss at 60 degrees of this test plate as an index, the following standard was applied for evaluation. The gloss at 60 degrees was measured using polarized light glossmeter "VG-2000" manufactured by Nippon Denshoku Industries Co., Ltd.

"○": 75 or more
"Δ" 50 or more and less than 75
"x": less than 50

Example 11

To a reactor flask equipped with a stirrer, a condenser, a temperature control system, a dropping pump and a nitrogen-introducing tube, 45 parts of deionized water, 5% by mass of emulsion A compounded with the rate shown in Table 3 and 0.2 part of 28% by mass aqueous ammonia were introduced, and the resultant mixture was heated to 75° C. while inside of the reactor was replaced by nitrogen, and an initiator solution obtained by dissolving 0.1 part of ammonium persulfate (polymerization initiator) into 5 parts of water was added to form a seed particle. The temperature of the resultant solution was measured by a thermometer, and after an exothermic peak was observed, the remainder of the emulsion A was dropped by taking 4 hours at the inside temperature of 75° C., and the resultant system was aged for 2 hours at the same inside temperature of 75° C. to polymerize a monomer of the emulsion A and to form a copolymer (A).

Subsequently, the system was cooled, and 28% by mass aqueous ammonia was added at a temperature of 60° C. or below till the pH of the system became 9 to prepare a water-based resin composition. The water-based resin composition thus obtained was used as a weather resistance improver for water-based paints. The results of evaluation are shown in Table 3.

Examples 12 to 19, and 21 to 30

Comparative Examples 9, 12, 14 and 15

The same procedure as in Example 1 was carried out to prepare water-based resin compositions using the emulsion A compounded with the rate shown in Tables 3 to 5.
The results of evaluation are shown in Tables 3 to 5.

Example 20

To a reactor flask equipped with a stirrer, a condenser, a temperature control system, a dropping pump and a nitrogen-introducing tube, 45 parts of deionized water was introduced. Subsequently, 0.2 part of 28% by mass aqueous ammonia and 5% by mass, with respect to the sum of the emulsion of the whole stages, measured and taken out from the emulsion A for the first stage polymerization described in Table 5 were introduced to the reactor, and the resultant mixture was heated to 75° C. while inside of the reactor was replaced by nitrogen, and a initiator solution obtained by dissolving 0.1 part of ammonium persulfate (polymerization initiator) into 5 parts of water was added to form a seed particle. The temperature of the resultant solution was measured by a thermometer, and after an exothermic peak was observed, the remainder of the emulsion A was dropped by taking 2 hours at the inside temperature of 75° C., and the resultant mixture was aged for 1 hour, and then the emulsion B was dropped by taking 2 hours at the inside temperature of 75° C. The resultant system was aged for 2 hours at the same inside temperature of 75° C. to reduce a remaining monomer and to form a copolymer (A). Subsequently, the system was cooled and 28% by mass aqueous ammonia was added at a temperature of 60° C. or below till the pH of the system became 9 to prepare a water-based resin composition. The results of evaluation are shown in Table 7.

Comparative Example 13

To a reactor flask equipped with a stirrer, a condenser, a temperature control system, a dropping pump and a nitrogen-introducing tube, 45 parts of deionized water was introduced. Subsequently, 5% by mass, with respect to the sum of the emulsion of the whole stages, measured and taken out from the emulsion A for the first stage polymerization described in Table 2 was introduced to the reactor, and the resultant mixture was heated to 75° C. while inside of the reactor was replaced by nitrogen, and an initiator solution obtained by dissolving 0.1 part of ammonium persulfate (polymerization initiator) into 5 parts of water was added to form a seed particle. The temperature of the resultant solution was measured by a thermometer, and after an exothermic peak was observed, the remainder of the emulsion A was dropped by taking 2 hours at the inside temperature of 75° C., and the resultant mixture was aged for 1 hour, and then 28% by mass aqueous ammonia was added till the pH of the system became 4, and the emulsion B was dropped by taking 2 hours at the inside temperature of 75° C. Subsequently, the resultant system was aged for 2 hours at the same inside temperature of 75° C. to reduce a remaining monomer and to form a copolymer (A).

Subsequently, the system was cooled and 28% by mass aqueous ammonia was added at a temperature of 60° C. or below till the pH of the system became 9 to prepare a water-based resin composition. The results of evaluation are shown in Table 6.

Comparative Examples 8, 10 and 11

The same procedure as in Example 11 was tried to carry out emulsion polymerization using the emulsion A compounded with the rate shown in Table 4, however, coagulated materials were generated at the stage when a seed particle was formed by adding the initiator solution obtained by dissolving 0.1 part of ammonium persulfate (polymerization initiator) into 5 parts of water, and stirring became difficult owing to coagulated materials generated in course of dropping of the remainder of the emulsion A, and hence the polymerization was stopped.

Reference Example 1

To a reactor flask equipped with a stirrer, a condenser, a temperature control system, a dropping pump and a nitrogen-introducing tube, 45 parts of deionized water and 5% by mass of emulsion A compounded with the rate shown in Table 5 were introduced, and the resultant mixture was heated to 75° C. while inside of the reactor was replaced by nitrogen, and an initiator solution obtained by dissolving 0.1 part of ammonium persulfate (polymerization initiator) into 5 parts of water was added to form a seed particle. The temperature of the resultant solution was measured by a thermometer, and after an exothermic peak was observed, the remainder of the emulsion A was dropped by taking 4 hours at the inside temperature of 75° C., and the resultant system was aged for 2 hours at the same inside temperature of 75° C. to polymerize a monomer of the emulsion A and to form a copolymer (A).

Subsequently, the system was cooled and 28% by mass aqueous ammonia was added at a temperature of 60° C. or below till the pH of the system became 9 to prepare a water-based resin composition.

TABLE 3

| | | | | Tg (° C.) of | Example | | | |
|---|---|---|---|---|---|---|---|---|
| | | Constituents | Raw materials | homopolymer | 11 | 12 | 13 | 14 |
| Emulsion (A) | 1st stage polymerization | Monomer (b) | MMA | 105 | 45 | — | — | — |
| | | | CHMA | 83 | — | 65 | 40 | — |
| | | | t-BMA | 108 | — | — | — | 45 |
| | | | n-BMA | 20 | — | — | — | — |
| | | | n-BA | −45 | — | — | 20 | — |
| | | | 2-EHA | −55 | 25 | 29 | — | 25 |
| | | | AA | 106 | — | — | — | — |
| | | | UVA | | — | — | — | — |
| | | | Total | | 70 | 94 | 60 | 70 |
| | | Monomer (a) | HALS1 | | 30 | 6 | — | 30 |
| | | | HALS2 | | — | — | 40 | — |
| | | | Total | | 30 | 6 | 40 | 30 |
| | | Emulsifier | Latemul B-118E (Conc. 28%) | | 10 | — | — | — |
| | | | Adeka Reasoap SR-10 | | — | — | — | — |
| | | | Adeka Reasoap ER-30 | | — | — | — | 6 |
| | | | Nonipol 200 | | — | 5 | 6 | — |
| | | Chain transfer agent | NDM | | 0 | 0 | 0 | 0 |
| | | | α-methyl styrene | | — | — | — | — |
| | | | Water | | 53 | 55 | 56 | 56 |
| Water-based resin | | Characteristic values | Concentration of monomer (a) in a copolymer () | | 30 | 6 | 40 | 30 |
| | | | Tg of monomer (b) in a copolymer (° C.) | | 20 | 20 | 20 | 20 |
| | | | MFT (° C.) | | 45 | 35 | 50 | 45 |
| | | | NV (% by mass) | | 50 | 50 | 50 | 50 |
| | | | Viscosity (mPa × S) | | 500 | 300 | 300 | 300 |
| | | | PH | | 9 | 9 | 9 | 9 |
| | | | Average particle diameter of a copolymer particle (nm) | | 130 | 150 | 150 | 150 |
| | | Evaluation results of water-based resin | Mass average molecular mass (Mw) | | Insoluble | Insoluble | Insoluble | Insoluble |
| | | | Mechanical stability | | ○ | ○ | ○ | ○ |
| | | | Storage stability | | ○ | ○ | ○ | ○ |
| | | | Polymerization stability | | ○ | ○ | ○ | ○ |
| Compounded resin | | Compounding ratio | Water-based resin (%) | | 93 | 70 | 95 | 93 |
| | | | Weather resistance improver for water-based paints | | 7 | 30 | 5 | 7 |
| | | | Total | | 100 | 100 | 100 | 100 |
| | | Characteristic values | HALS content (part(s)) | | 2.1 | 1.8 | 2 | 2.1 |
| | | | MFT (° C.) | | 50 | 50 | 50 | 50 |
| | | | NV (% by mass) | | 50 | 50 | 50 | 50 |
| | | | Viscosity (mPa · S) | | 400 | 300 | 300 | 300 |
| | | Evaluation results of coating film | Clear Initial gloss | | 79 | 79 | 79 | 79 |
| | | | Compatibility | | ○ | ○ | ○ | ○ |
| | | | Water resistance | | ○ | ○ | ○ | ◎ |
| | | | Weather resistance (2,000 hr) | | ○Δ | ○Δ | ○Δ | ○ |
| | | | Capability for improving weather resistance | | ○ | ○ | ○ | ◎ |
| | | | Enamel Pigment dispersibility | | A | A | A | A |
| | | | Weather resistance (2,000 hr) | | Δ | Δ | Δ | ○ |
| | | | Chalking | | ○ | ○ | ○ | ○ |
| | | | Capability for improving weather resistance | | ○ | ○ | ○ | ◎ |

| | | | | Tg (° C.) of | Example | | |
|---|---|---|---|---|---|---|---|
| | | Constituents | Raw materials | homopolymer | 15 | 16 | 17 |
| Emulsion (A) | 1st stage polymerization | Monomer (b) | MMA | 105 | 55 | 30 | — |
| | | | CHMA | 83 | — | — | 52 |
| | | | t-BMA | 108 | — | — | — |
| | | | n-BMA | 20 | — | — | — |
| | | | n-BA | −45 | — | — | 28 |
| | | | 2-EHA | −55 | 39 | 20 | — |
| | | | AA | 106 | — | — | — |
| | | | UVA | | — | — | — |
| | | | Total | | 94 | 50 | 80 |
| | | Monomer (a) | HALS1 | | — | — | — |
| | | | HALS2 | | 6 | 50 | 20 |
| | | | Total | | 6 | 50 | 20 |

TABLE 3-continued

| | | | | | |
|---|---|---|---|---|---|
| Water-based resin | Emulsifier | Latemul B-118E (Conc. 28%) | — | — | — |
| | | Adeka Reasoap SR-10 | 3 | 5 | 10 |
| | | Adeka Reasoap ER-30 | — | — | — |
| | | Nonipol 200 | — | — | — |
| | Chain transfer agent | NDM | 0 | 0 | 0 |
| | | α-methyl styrene | — | — | — |
| | | Water | 53 | 55 | 60 |
| | Characteristic values | Concentration of monomer (a) in a copolymer (□) | 6 | 50 | 20 |
| | | Tg of monomer (b) in a copolymer (° C.) | 20 | 20 | 20 |
| | | MFT (° C.) | 35 | 60 | 45 |
| | | NV (% by mass) | 50 | 50 | 50 |
| | | Viscosity (mPa × S) | 500 | 500 | 500 |
| | | PH | 9 | 9 | 9 |
| | | Average particle diameter of a copolymer particle (nm) | 130 | 130 | 130 |
| | Evaluation results of water-based resin | Mass average molecular mass (Mw) | Insoluble | Insoluble | Insoluble |
| | | Mechanical stability | ○ | ○ | ◎ |
| | | Storage stability | ◎ | ○ | ◎ |
| | | Polymerization stability | ◎ | ○ | ◎ |
| Compounded resin | Compounding ratio | Water-based resin (%) | 70 | 96 | 90 |
| | | Weather resistance improver for water-based paints | 30 | 4 | 10 |
| | | Total | 100 | 100 | 100 |
| | Characteristic values | HALS content (part(s)) | 1.8 | 2 | 2 |
| | | MFT (° C.) | 50 | 50 | 50 |
| | | NV (% by mass) | 50 | 50 | 50 |
| | | Viscosity (mPa · S) | 350 | 400 | 400 |
| | Evaluation results of coating film | Clear Initial gloss | 79 | 79 | 79 |
| | | Compatibility | ○ | ○ | ○ |
| | | Water resistance | ◎ | ◎ | ○ |
| | | Weather resistance (2,000 hr) | ○ | ○ | ○ |
| | | Capability for improving weather resistance | ◎ | ◎ | ◎ |
| | | Enamel Pigment dispersibility | A | A | A |
| | | Weather resistance (2,000 hr) | ○ | ○ | ○ |
| | | Chalking | ○ | ○ | ○ |
| | | Capability for improving weather resistance | ◎ | ◎ | ◎ |

TABLE 4

| | | | | Tg (° C.) of | Example | | | |
|---|---|---|---|---|---|---|---|---|
| | Constituents | | Raw materials | homopolymer | 18 | 19 | 21 | 22 |
| Emulsion (A) | 1st stage polymerization | Monomer □b□ | MMA | 105 | — | — | — | — |
| | | | CHMA | 83 | — | — | — | — |
| | | | t-BMA | 108 | — | — | 4 | 70 |
| | | | n-BMA | 20 | 90 | 80 | 90 | — |
| | | | n-BA | −45 | — | — | — | 10 |
| | | | 2-EHA | −55 | — | — | — | — |
| | | | AA | 106 | — | — | — | — |
| | | | UVA | | — | — | — | — |
| | | | Total | | 90 | 80 | 94 | 80 |
| | | Monomer □a□ | HALS1 | | 10 | — | 6 | — |
| | | | HALS2 | | — | 20 | — | 20 |
| | | | Total | | 10 | 20 | 6 | 20 |
| | | Emulsifier | Latemul B-118E (Conc. 28%) | | — | — | — | — |
| | | | Adeka Reasoap SR-10 | | 1 | 3 | 3 | 3 |
| | | | Adeka Reasoap ER-30 | | — | 2 | — | 2 |
| | | | Nonipol 200 | | — | — | — | — |
| | | Chain transfer agent | NDM | | 0 | 0 | 0.1 | 1 |
| | | | α-methyl styrene | | — | — | — | — |
| | | | Water | | 51 | 55 | 53 | 56 |
| Water-based resin | | Characteristic values | Concentration of monomer (a) in a copolymer (□) | | 10 | 20 | 6 | 20 |
| | | | Tg of monomer (b) in a copolymer (° C.) | | 20 | 20 | 20 | 65 |
| | | | MFT (° C.) | | 40 | 45 | 35 | 80 |
| | | | NV (% by mass) | | 50 | 50 | 50 | 50 |
| | | | Viscosity (mPs · S) | | 500 | 500 | 300 | 300 |
| | | | PH | | 9 | 9 | 9 | 9 |

TABLE 4-continued

| | | | | | | | |
|---|---|---|---|---|---|---|---|
| Compounded resin | Evaluation results of water-based resin | Average particle diameter of a copolymer particle (nm) | | 130 | 130 | 150 | 150 |
| | | Mass average molecular mass (Mw) | | Insoluble | Insoluble | 294,000 | 61,000 |
| | | Mechanical stability | | ○ | ◎ | ○ | ◎ |
| | | Storage stability | | ◎ | ◎ | ◎ | ◎ |
| | | Polymerization stability | | ○ | ◎ | ◎ | ◎ |
| | Compounding ratio | Water-based resin (%) | | 85 | 90 | 70 | 90 |
| | | Weather resistance improver for water-based paints | | 15 | 10 | 30 | 10 |
| | | Total | | 100 | 100 | 100 | 100 |
| | Characteristic values | HALS content (part(s)) | | 1.5 | 2 | 1.8 | 2 |
| | | MFT (° C.) | | 50 | 50 | 50 | 55 |
| | | NV (% by mass) | | 50 | 50 | 50 | 50 |
| | | Viscosity (mPa · S) | | 400 | 400 | 350 | 300 |
| | Evaluation results of coating film | Clear | Initial gloss | 79 | 79 | 79 | 79 |
| | | | Compatibility | ○ | ○ | ○ | ○ |
| | | | Water resistance | ◎ | ◎ | ◎ | ◎ |
| | | | Weather resistance (2,000 hr) | ○ | ○ | ◎ | ○ |
| | | | Capability for improving weather resistance | ◎ | ◎ | ◎ | ◎ |
| | | Enamel | Pigment dispersibility | A | A | A | A |
| | | | Weather resistance (2,000 hr) | ○ | ○ | ◎ | ○ |
| | | | Chalking | ○ | ○ | ○ | ○ |
| | | | Capability for improving weather resistance | ◎ | ◎ | ◎ | ◎ |

| | | | Tg (° C.) of homopolymer | Example | | |
|---|---|---|---|---|---|---|
| | Constituents | Raw materials | | 23 | 24 | 25 |
| Emulsion (A) | 1st stage polymerization □b□ | Monomer | MMA | 105 | — | — | — |
| | | | CHMA | 83 | — | — | — |
| | | | t-BMA | 108 | — | — | — |
| | | | n-BMA | 20 | 94 | 40 | 80 |
| | | | n-BA | −45 | — | 10 | — |
| | | | 2-EHA | −55 | — | — | — |
| | | | AA | 106 | — | — | — |
| | | | UVA | | — | — | — |
| | | | Total | | 94 | 50 | 80 |
| | | Monomer □a□ | HALS1 | | 6 | — | — |
| | | | HALS2 | | — | 50 | 20 |
| | | | Total | | 6 | 50 | 20 |
| | | Emulsifier | Latemul B-118E (Conc. 28%) | | — | — | — |
| | | | Adeka Reasoap SR-10 | | 3 | 2 | 2 |
| | | | Adeka Reasoap ER-30 | | — | 1 | 1 |
| | | | Nonipol 200 | | — | — | — |
| | | Chain transfer agent | NDM | | 0 | 3.5 | 10 |
| | | | α-methyl styrene | | — | — | — |
| | | | Water | | 53 | 57 | 63 |
| Water-based resin | | Characteristic values | Concentration of monomer (a) in a copolymer (□) | | 6 | 50 | 20 |
| | | | Tg of monomer (b) in a copolymer (° C.) | | 20 | 5 | 20 |
| | | | MFT (° C.) | | 40 | 30 | 10 |
| | | | NV (% by mass) | | 50 | 50 | 50 |
| | | | Viscosity (mPs · S) | | 300 | 300 | 300 |
| | | | PH | | 9 | 9 | 9 |
| | | | Average particle diameter of a copolymer particle (nm) | | 150 | 150 | 150 |
| | | Evaluation results of water-based resin | Mass average molecular mass (Mw) | | 452,000 | 21,000 | 5,000 |
| | | | Mechanical stability | | ◎ | ○ | ◎ |
| | | | Storage stability | | ◎ | ○ | ◎ |
| | | | Polymerization stability | | ◎ | ○ | ◎ |
| Compounded resin | | Compounding ratio | Water-based resin (%) | | 70 | 96 | 90 |
| | | | Weather resistance improver for water-based paints | | 30 | 4 | 10 |
| | | | Total | | 100 | 100 | 100 |
| | | Characteristic values | HALS content (part(s)) | | 2.1 | 2 | 2 |
| | | | MFT (° C.) | | 50 | 50 | 50 |
| | | | NV (% by mass) | | 50 | 50 | 50 |
| | | | Viscosity (mPa · S) | | 350 | 400 | 400 |
| | | Evaluation results of coating film | Clear | Initial gloss | 79 | 79 | 79 |
| | | | | Compatibility | ○ | ○ | ○ |
| | | | | Water resistance | ◎ | ◎ | ◎ |
| | | | | Weather resistance (2,000 hr) | ○ | ◎ | ○ |
| | | | | Capability for improving | ◎ | ◎ | ◎ |

TABLE 4-continued

| | | | | | |
|---|---|---|---|---|---|
| | weather resistance | | | | |
| Enamel | Pigment dispersibility | A | A | A | |
| | Weather resistance (2,000 hr) | ○ | ⊚ | ○ | |
| | Chalking | ○ | ○ | ○ | |
| | Capability for improving weather resistance | ⊚ | ⊚ | ⊚ | |

TABLE 5

| Constituents | | Raw materials | Tg (° C.) of homopolymer | Example 26 | Example 27 | Example 28 | Example 29 | Example 30 | Ref. Ex. 1 |
|---|---|---|---|---|---|---|---|---|---|
| Emulsion (A) | 1st stage polymerization | Monomer (b) MMA | 105 | — | — | — | — | — | — |
| | | CHMA | 83 | — | — | — | — | — | — |
| | | t-BMA | 108 | — | — | — | — | — | 64 |
| | | n-BMA | 20 | 80 | 80 | 80 | 90 | 65 | — |
| | | n-BA | −45 | — | — | — | — | — | — |
| | | 2-EHA | −55 | — | — | — | — | — | 34 |
| | | AA | 106 | — | — | — | — | — | 2 |
| | | UVA | | — | — | — | — | 15 | — |
| | | Total | | 80 | 80 | 80 | 90 | 80 | 100 |
| | Monomer (a) | HALS1 | | — | — | — | 10 | — | — |
| | | HALS2 | | 20 | 20 | 20 | — | 20 | — |
| | | Total | | 20 | 20 | 20 | 10 | 20 | 0 |
| | Emulsifier | Latemul B-118E (Conc. 28%) | | — | — | — | — | — | — |
| | | Adeka Reasoap SR-10 | | 2 | 2 | 2 | 2 | 2 | 3 |
| | | Adeka Reasoap ER-30 | | 1 | 1 | 1 | 1 | 1 | — |
| | | Nonipol 200 | | — | — | — | — | — | — |
| | Chain transfer agent | NDM | | 11 | 0.9 | 0.5 | — | 10 | 0 |
| | | α-methyl styrene | | — | — | — | 8 | — | — |
| | | Water | | 62 | 54 | 54 | 61 | 63 | 53 |
| Water-based resin | Characteristic values | Concentration of monomer (a) in a copolymer (□) | | 20 | 20 | 20 | 10 | 20 | 0 |
| | | Tg of monomer (b) in a copolymer (° C.) | | 20 | 20 | 20 | 5 | 20 | 40 |
| | | MFT (° C.) | | 10 | 35 | 40 | 15 | 10 | 50 |
| | | NV (% by mass) | | 50 | 50 | 50 | 50 | 50 | 50 |
| | | Viscosity (mPa × S) | | 300 | 300 | 300 | 300 | 300 | 300 |
| | | PH | | 9 | 9 | 9 | 9 | 9 | 9 |
| | | Average particle diameter of a copolymer particle (nm) | | 150 | 150 | 150 | 150 | 150 | 150 |
| | Evaluation results of water-based resin | Mass average molecular mass (Mw) | | 4,000 | 53,000 | Insoluble | 20,000 | 5,000 | 211,000 |
| | | Mechanical stability | | ⊚ | ⊚ | ⊚ | ⊚ | ○ | ○ |
| | | Storage stability | | ⊚ | ⊚ | ⊚ | ⊚ | ○ | ⊚ |
| | | Polymerization stability | | ⊚ | ⊚ | ⊚ | ⊚ | ○ | ⊚ |
| Compounded resin | Compounding ratio | Water-based resin (%) | | 90 | 90 | 90 | 85 | 90 | 100 |
| | | Weather resistance improver for water-based paints | | 10 | 10 | 10 | 15 | 10 | 0 |
| | | Total | | 100 | 100 | 100 | 100 | 100 | 100 |
| | Characteristic values | HALS content (part(s)) | | 2 | 2 | 2 | 1.5 | 2 | 0 |
| | | MFT (° C.) | | 50 | 50 | 50 | 50 | 50 | 50 |
| | | NV (% by mass) | | 50 | 50 | 50 | 50 | 50 | 50 |
| | | Viscosity (mPa · S) | | 400 | 400 | 400 | 400 | 400 | 300 |
| | Evaluation results of coating film | Clear Initial gloss | | 79 | 79 | 79 | 79 | 79 | 79 |
| | | Compatibility | | ○ | ○ | ○ | ○ | ○ | — |
| | | Water resistance | | ⊚ | ⊚ | ⊚ | ⊚ | ⊚ | ⊚ |
| | | Weather resistance (2,000 hr) | | ○Δ | ⊚ | ⊚ | ⊚ | ⊚ | X |
| | | Capability for improving weather resistance | | ○ | ⊚ | ⊚ | ⊚ | ⊚ | — |
| | | Enamel Pigment dispersibility | | A | A | A | A | A | A |
| | | Weather resistance (2,000 hr) | | ○Δ | ⊚ | ⊚ | ⊚ | ⊚ | XX |
| | | Chalking | | ○ | ○ | ○ | ○ | ○ | X |
| | | Capability for improving weather resistance | | ○ | ⊚ | ⊚ | ⊚ | ⊚ | — |

TABLE 6

| | | | Tg (° C.) of | Comparative Example | | | | | | |
|---|---|---|---|---|---|---|---|---|---|---|
| | Constituents | Raw materials | homopolymer | 8 | 9 | 10 | 11 | 12 | 13 | 14 |
| Emulsion (A) | 1st stage polymerization | Monomer (b) MMA | 105 | — | 59.9 | 50 | — | — | 47 | — |
| | | CHMA | 83 | — | — | — | 55 | 65 | — | 45 |
| | | t-BMA | 108 | — | — | — | — | — | — | — |
| | | n-BMA | 20 | 20 | — | — | — | — | — | — |
| | | n-BA | −45 | — | — | — | — | — | 37 | 30 |
| | | 2-EHA | −55 | — | 40 | 35 | 23 | 27 | — | — |
| | | AA | 106 | — | — | 5 | 2 | 2 | — | — |
| | | UVA | | — | — | — | — | — | — | 25 |
| | | Total | | 20 | 99.9 | 90 | 80 | 94 | 84 | 100 |
| | | Monomer (a) HALS1 | | 80 | — | 10 | 20 | 6 | — | — |
| | | HALS2 | | — | 0.1 | — | — | — | 16 | — |
| | | Total | | 80 | 0.1 | 10 | 20 | 6 | 16 | 0 |
| | Emulsifier | Latemul B-118E (Conc. 28%) | | — | — | — | — | — | — | — |
| | | Adeka Reasoap SR-10 | | 3 | 3 | 10 | 3 | — | — | 3 |
| | | Adeka Reasoap ER-30 | | 2 | 3 | — | 3 | — | 15 | — |
| | | Nonipol 200 | | — | — | — | — | 10 | — | — |
| | Chain transfer agent | NDM | | 0 | 0 | 0 | 0 | 0 | 1 | 0 |
| | | α-methyl styrene | | — | — | — | — | — | — | — |
| | | Water | | 55 | 56 | 60 | 56 | 60 | 66 | 53 |
| Water-based resin | Characteristic values | Concentration of monomer (a) in a copolymer (□) | | 70 | 0.1 | 10 | 20 | 6 | 16 | 0 |
| | | Tg of monomer (b) in a copolymer (° C.) | | 30 | 20 | 20 | 20 | 20 | 10 | 20 |
| | | MFT (° C.) | | — | 35 | — | — | 35 | 25 | 35 |
| | | NV (% by mass) | | — | 50 | — | — | 50 | 50 | 50 |
| | | Viscosity (mPa × S) | | — | 500 | — | — | 300 | 300 | 500 |
| | | PH | | — | 9 | — | — | 9 | 9 | 9 |
| | | Average particle diameter of a copolymer particle (nm) | | — | 130 | — | — | 150 | 150 | 130 |
| | Evaluation results of water-based resin | Mass average molecular mass (Mw) | | — | 277,000 | — | — | Insoluble | 33,000 | 221,000 |
| | | Mechanical stability | | — | ◯ | — | — | ◯ | ◯ | ◯ |
| | | Storage stability | | — | ◉ | — | — | Δ | ◉ | ◯ |
| | | Polymerization stability | | X | ◯ | X | X | Δ | ◯ | Δ |
| Compounded resin | Compounding ratio | Water-based resin (%) | | — | 50 | — | — | 70 | 90 | 90 |
| | | Weather resistance improver for water-based paints | | — | 50 | — | — | 30 | 10 | 10 |
| | | Total | | — | 100 | — | — | 100 | 100 | 100 |
| | Characteristic values | HALS content (part(s)) | | — | 0.05 | — | — | 1.8 | 1.6 | 0 |
| | | MFT (° C.) | | — | 45 | — | — | 45 | 50 | 50 |
| | | NV (% by mass) | | — | 50 | — | — | 50 | 50 | 50 |
| | | Viscosity (mPa · S) | | — | 450 | — | — | 300 | 300 | 400 |
| | Evaluation results of coating film | Clear Initial gloss | | — | 80 | — | — | 79 | 79 | 79 |
| | | Compatibility | | — | ◯ | — | — | ◯ | ◯ | ◯ |
| | | Water resistance | | — | ◉ | — | — | Δ | X | ◉ |
| | | Weather resistance (2,000 hr) | | — | X | — | — | Δ | Δ | Δ |
| | | Capability for improving weather resistance | | — | X | — | — | Δ | Δ | Δ |
| | | Enamel Pigment dispersibility | | — | B | — | — | A | A | A |
| | | Weather resistance (2,000 hr) | | — | XX | — | — | X | X | X |
| | | Chalking | | — | X | — | — | Δ | Δ | X |
| | | Capability for improving weather resistance | | — | X | — | — | Δ | Δ | Δ |

TABLE 7

| | | Constituents | Raw materials | Tg (° C.) | Example 20 |
|---|---|---|---|---|---|
| Emulsion (A) | 1st stage polymerization | Monomer (b) | CHMA | 83 | — |
| | | | t-BMA | 108 | 25 |
| | | | n-BA | −45 | 15 |
| | | | 2-EHA | −55 | — |
| | | | AA | 106 | — |
| | | | Total | | 40 |
| | | Monomer (a) | HALS1 | | — |
| | | | HALS2 | | 10 |
| | | | Total | | 10 |

TABLE 7-continued

| Constituents | | | Raw materials | Tg (° C.) | Example 20 |
|---|---|---|---|---|---|
| | | Emulsifier | Adeka Reasoap SR-10 | | 2 |
| | | | Adeka Reasoap ER-30 | | — |
| | | Chain transfer agent | NDM | | 0 |
| | | | α-methyl styrene | | — |
| | | | Water | | 27 |
| Emulsion (B) | 2nd stage polymerization | Monomer ∇(b) | CHMA | 83 | — |
| | | | n-BMA | 20 | 35 |
| | | | 2-EHA | −55 | — |
| | | | Total | | 35 |
| | | Monomer (a) | HALS1 | | — |
| | | | HALS2 | | 15 |
| | | | Total | | 15 |
| | | Emulsifier | SR-10 | | 2 |
| | | | Water | | 27 |
| Water-based resin | | Characteristic values | Concentration of monomer (a) in a copolymer (□) | | 25 |
| | | | Tg of monomer (b) in a copolymer (° C.) | | 25 |
| | | | MFT (° C.) | | 45 |
| | | | NV (% by mass) | | 50 |
| | | | Viscosity (mPa × S) | | 500 |
| | | | pH | | 9 |
| | | | Average particle diameter of a copolymer particle (nm) | | 130 |
| | | Evaluation results of water-based resin | Mass average molecular mass (Mw) | | Insoluble |
| | | | Mechanical stability | | ⊚ |
| | | | Storage stability | | ⊚ |
| | | | Polymerization stability | | ⊚ |
| Compounded resin | | Compounding ratio | Water-based resin (%) | | 92 |
| | | | Weather resistance improver for water-based paints | | 8 |
| | | | Total | | 100 |
| | | Characteristic values | HALS content (part(s)) | | 2 |
| | | | MFT (° C.) | | 50 |
| | | | NV (% by mass) | | 50 |
| | | | Viscosity (mPa · S) | | 400 |
| | | Evaluation results of coating film | Clear Initial gloss | | 79 |
| | | | Compatibility | | ○ |
| | | | Water resistance | | ⊚ |
| | | | Weather resistance (2,000 hr) | | ○ |
| | | | Capability for improving weather resistance | | ⊚ |
| | | | Enamel Pigment dispersibility | | A |
| | | | Weather resistance (2,000 hr) | | ○ |
| | | | Chalking | | ○ |
| | | | Capability for improving weather resistance | | ⊚ |

Abbreviations in these tables represent the following compounds.
MMA: Methyl methacrylate
t-BMA: Tertiary butyl methacrylate
CHMA: Cyclohexyl methacrylate
n-BMA: Normal butyl methacrylate
n-BA: Normal butyl acrylate
2-EHA: 2-ethylhexyl acrylate
AA: Acrylic acid
UVA1: [Formula VIII]

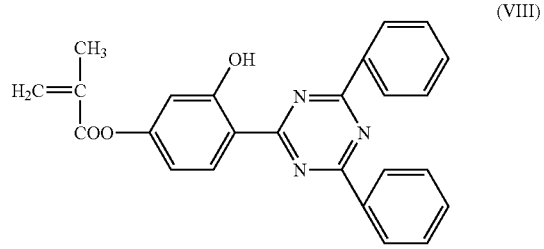

(VIII)

HALS1: 4-methacryloyloxy-2,2,6,6-tetramethylpiperidine
HALS2: 4-methacryloyloxy-1,2,2,6,6-pentamethylpiperidine "Adeka Reasoap SR-10": reactive anion type surfactant (trade name, manufactured by Asahi Denka Kogyo K.K.)
"Adeka Reasoap ER-30": reactive nonion type surfactant (trade name, manufactured by Asahi Denka Kogyo K.K.)
"Latemul B-118E": nonreactive anion type surfactant (trade name, manufactured by Kao Corporation)
"Nonipol 200": nonreactive nonion type surfactant (trade name, manufactured by Sanyo Chemical Industries, Ltd.)
NDM: Normal dodecyl mercaptan It is obvious from Tables 3 to 7 that the weather resistance improvers for water-based paints of the present examples can realize conspicuous improvement in weather resistance when they are added to other water-based paints, as well as they are excellent in mechanical stability, storage stability and polymerization stability.

Contrary to this, the weather resistance improvers for water-based paints of the comparative examples are not excellent in polymerization stability or storage stability, and are insufficient in at least one characteristics of capability for improving weather resistance, water resistance, coloring property and pigment dispersibility, even if they are polymerizable, when they are added to other water-based paints as the weather resistance improvers for water-based paints.

Consequently, it is obvious that the weather resistance improver for water-based paints of the present invention is also useful as a weather resistance improver for water-based paints, which is excellent in mechanical stability and storage stability and has conspicuous capability for improving weather resistance.

Use as a Weather Resistance Improver for Thermoplastic Resins

Various evaluations of the weather resistance improver for thermoplastic resins were carried out by the following methods.

<Preparation of Test Plate>

A plate molded article of 100 mm×100 mm×2 mm was made according to a compounding ratio shown in the following Table 9 using "ACRYPET MD" (trade name, manufactured by Mitsubishi Rayon Co., Ltd.) as a base thermostatic resin. As a nonreactive HALS shown in Table 7, "SANOL LS-770" (trade name, manufactured by Sankyo Lifetech Co., Ltd.) was used. The initial mass average molecular mass (Mw) of "ACRYPET MD" was 92,000.

<Odor Test>

In a desiccator, 300 g of a weather resistance improver for thermoplastic resins was kept at 20° C. for a day, and after that, an organoleptic examination was carried out at 20° C. The following standard was used for judgement.

"○": Almost no odor is felt.

"x": Irritant odor or solvent smell is distinctly felt.

<Compatibility Test>

"○": Neither haze nor bleed is observed.

"x": Haze or bleed is observed.

<Weather Resistance Test>

The test was carried out for 3,000 hours using a sunshine carbon weatherometer (manufactured by Suga test instruments Co., Ltd., "WEL-SUN-HC-B type" weather meter (black panel temperature: 63±3° C.; cycle of raining: 12 minutes and irradiation: 48 minutes)), and color difference (hereinafter, expressed as "ΔE") and molecular mass were measured, and the results were judged according to the following standard.

<ΔE>

Color difference was measured with spectroscopic color difference meter "SE2000" manufactured by Nippon Denshoku Industries Co., Ltd.

"◉": 3 or less

"○": 3 or more and less tan 5

"Δ": 5 or more and less than 10

"x": 10 or more

<Retention of Molecular Mass>

From each test plate which had been subjected to the weather resistance test, 0.4 g of the plate was cut out in a vertical direction and put in a sample bottle. Then, 100 g of tetrahydrofuran (THF) was added to the bottle and kept overnight at a room temperature and used for molecular mass measurement. The same method mentioned above was used for the molecular mass measurement.

"○": 70% or more (Mw being 64,000 or more)

"x": less than 70 (Mw being less than 64,000)

Example 31

To a reactor flask equipped with a stirrer, a condenser, a temperature control system, a dropping pump and a nitrogen-introducing tube, 45 parts of deionized water, and then, 0.2 part of 28% by mass aqueous ammonia and 5% by mass of emulsion A compounded with the rate shown in Table 6 were introduced, and the resultant mixture was heated to 75° C. while inside of the reactor was replaced by nitrogen, and a initiator solution obtained by dissolving 0.1 part of ammonium persulfate (polymerization initiator) into 5 parts of water was added to form a seed particle. The temperature of the resultant solution was measured by a thermometer, and after an exothermic peak was observed, the remainder of the emulsion A was dropped by taking 4 hours at the inside temperature of 75° C., and the resultant system was aged for 2 hours at the same inside temperature of 75° C. to polymerize a monomer of the emulsion A and to form a copolymer emulsion.

Subsequently, the system was cooled and 25% by mass aqueous ammonia was added at a temperature of 60° C. or below till the pH of the system became 9 to obtain dispersed emulsion of a weather resistance improver for thermoplastic resins.

The concentration of the resultant dispersed emulsion was adjusted to 1% and average particle diameter was measured at 25° C. using "Fiber-Optics Particle Analyzer with Autosampler FPAR-1000" manufactured by Otsuka Electronics Co., Ltd. The average particle diameter of cumulant analysis obtained by the measurement was adopted as a primary particle diameter.

The dispersed emulsion cooled to room temperature was spray dried with a spray dryer ("L-8 type", manufactured by Ohkawara Kakohki Co., Ltd.) under the conditions of the inlet temperature of 170° C., the outlet temperature of 60° C., and the number of revolution of atomizer of 25,000 rpm to recover solid matter as the polymeric weather resistance improver. The polymeric weather resistance improver thus obtained was observed by a scanning electron microscope, and an average of measured particle diameters of 20 particles was adopted as a secondary particle diameter.

The results of evaluation are shown in Table 8.

Example 32

The same procedure as in Example 31 was carried out for emulsion polymerization of emulsion (A) having the composition shown in Table 6, and the resultant dispersed emulsion was subjected to spray drying to recover solid matter using the same procedure as in Example 31. The results of evaluation are shown in Table 8.

Example 33

The same procedure as in Example 31 was carried out for emulsion polymerization of emulsion (A) having the composition shown in Table 6, and the resultant dispersed emulsion was adjusted to 40° C., and introduced into the same amount of 1.5% calcium acetate aqueous solution of a coagulating agent while the mixture was stirred to coagulate the dispersed emulsion, and the resultant mixture was kept at 70° C. for 5 minutes to obtain a coagulated slurry. The resultant coagulated slurry was dehydrated and dried, and solid matter was recovered as a weather resistance improver for thermoplastic resins. The results of evaluation are shown in Table 8.

Comparative Example 15

The same procedure as in Example 31 was carried out for emulsion polymerization of emulsion (A) having the composition shown in Table 6, and the resultant dispersed emulsion was subjected to spray drying to recover solid matter using the same procedure as in Example 31. The results of evaluation are shown in Table 8.

Comparative Example 16

The same procedure as in Example 31 was carried out for preparation of emulsion (A) having the composition shown in Table 3 and for emulsion polymerization of the emulsion (A), however, aggregation and fixation of the system occurred after 10 minutes from the start of dropping of the emulsion (A) and the polymerization was stopped.

Comparative Example 17

To a reactor flask equipped with a stirrer, a condenser, a temperature control system, a dropping pump and a nitrogen-introducing tube, 20 parts by mass of 4-methacryloyloxy-1,2,2,6,6-pentamethylpiperidine, 72 parts by mass of methyl methacrylate, 8 parts by mass of n-butyl acrylate, 1 part by mass of n-dodecyl mercaptan, and 80 parts by mass of ethyl acetate were introduced, and nitrogen was introduced from the nitrogen introducing tube, and the resultant mixture was heated to 50° C. and stirred while inside of the reactor was replaced by nitrogen. Subsequently, 0.3 part of azobisisobutyronitrile (AIBN) dissolved in 20 parts of ethyl acetate was added to the mixture and stirred for 1 hour. After the stirring was finished, the resultant system was heated to 70° C., and the reaction was carried out for 8 hours. After the polymerization was finished, the resultant polymer was put into 1,000 parts of methanol and the mixture was stirred by a homomixer for 30 minutes. After the stirring, the mixture was subjected to a suction filtration using No. 2 filter paper, and the filter residue was dried at 60° C. with a circulating hot air dryer to recover solid [matter] as the weather resistance improver for thermoplastic resins of Comparative Example 17. In the case of Comparative Example 17, the solid matter did not have a shape of particle because the solid matter was recovered by reprecipitation after a solution polymerization so that evaluation of a particle diameter of primary particle or secondary particle was impossible. The results of evaluation are shown in Table 8.

Comparative Example 18

To a reactor flask equipped with a stirrer, a condenser, a temperature control system, a dropping pump and a nitrogen-introducing tube, 10 parts by mass of 4-methacryloyloxy-1,2,2,6,6-pentamethylpiperidine, 77 parts by mass of methyl methacrylate, 8 parts by mass of n-butyl acrylate, 5 parts by mass of acrylic acid, 1 part by mass of n-dodecyl mercaptan, and 80 parts by mass of ethyl acetate were introduced, and nitrogen was introduced from the nitrogen introducing tube, and the resultant mixture was heated to 50° C. and stirred while inside of the reactor was replaced by nitrogen. Subsequently, 0.3 part of azobisisobutyronitrile (AIBN) dissolved in 20 parts of ethyl acetate was added to the mixture and stirred for 1 hour. After the stirring was finished, the resultant system was heated to 70° C., and the reaction was carried out for 8 hours. After the polymerization was finished, the resultant polymer was put into 1,000 parts of methanol and the mixture was stirred by a homomixer for 30 minutes. After the stirring, the mixture was subjected to a suction filtration using No. 2 filter paper, and the filter residue was dried at 60° C. with a circulating hot air dryer to recover solid matter as the weather resistance improver for thermoplastic resins of Comparative Example 18. In the case of Comparative Example 18 as well as in the case of Comparative Example 17, the solid matter did not have a shape of particle because the solid matter was recovered by reprecipitation after a solution polymerization so that evaluation of a particle diameter of primary particle or secondary particle was impossible. The results of evaluation are shown in Table 8.

TABLE 8

| | | | Raw | Tg (° C.) of | Example | | | Comparative Example | | | |
|---|---|---|---|---|---|---|---|---|---|---|---|
| | | Constituents | materials | homopolymer | 31 | 32 | 33 | 15 | 16 | 17 | 18 |
| Emulsion (A) | 1st stage polymerization | Monomer (b) | MMA | 105 | 72 | 45 | 70 | 35 | 70 | — | — |
| | | | n-BA | −45 | 8 | 5 | 20 | 5 | 8 | | |
| | | | AA | 106 | — | — | — | — | 2 | | |
| | | | Total | | 80 | 50 | 90 | 40 | 80 | | |
| | | Monomer (a) | HALS1 | | — | — | 10 | — | — | | |
| | | | HALS2 | | 20 | 50 | — | 60 | 20 | | |
| | | | Total | | 20 | 50 | 10 | 60 | 20 | | |
| | | Emulsifier | Perex OTP | | — | — | 4 | — | — | | |
| | | | Adeka Reasoap SR-10 | | 3 | 2 | — | 2 | 2 | | |
| | | | Adeka Reasoap ER-30 | | — | 2 | — | — | — | | |
| | | Chain transfer agent | NDM | | 2.5 | 8 | 0.1 | — | — | | |
| | | | Water | | 50 | 50 | 50 | 50 | 50 | | |
| Characteristic Values | | Calculated Tg of monomer (b) in a copolymer (° C.) | | | 80 | 80 | 55 | 75 | 80 | 40 | 40 |
| | | Secondary particle diameter | | | 30 | 30 | 200 | 40 | — | — | — |
| | | Primary particle diameter | | | 0.15 | 0.2 | 0.2 | 0.2 | — | — | — |
| | | Mass average molecular mass (Mw) | | | 21,000 | 10,000 | 230,000 | Insoluble | — | 20,000 | 22,000 |
| Evaluation | | Polymerization stability | | | ○ | ○ | ○ | Δ | X | ○ | ○ |
| | | Odor | | | ○ | ○ | ○ | ○ | ○ | X | X |

Abbreviations in these tables represent the following compounds.
MMA: Methyl methacrylate
n-BA: Normal butyl acrylate
AA: Acrylic acid
HALS1: 4-methacryloyloxy-2,2,6,6-tetramethylpiperidine
HALS2: 4-methacryloyloxy-1,2,2,6,6-pentamethylpiperidine
"Pelex OT-P": nonreactive anion type surfactant (trade name, manufactured by Kao Corporation)
"Adeka Reasoap SR-10": reactive anion type surfactant (trade name, manufactured by Asahi Denka Kogyo K.K.)
"Adeka Reasoap ER-30": reactive nonion type surfactant (trade name, manufactured by Asahi Denka Kogyo K.K.)
NDM: Normal dodecyl mercaptan Examples 34 to 37

Comparative Examples 19 to 24

The compounded materials of Table 9, in which fixed amounts of the weather resistance improvers for thermoplastic resins obtained in the Examples 31, 32 and 33 and the Comparative Examples 15 and 17 were compounded, were molded into plates each having the size of 100 mm×100 mm×2 mm and adopted as test plates for compatibility test, weather resistance test, and measurement of retention of molecular mass. The initial mass average molecular mass (Mw) based on standard polystyrene of "ACRYPET MD" used in Table 9 was 92,000. Further, as the nonreactive HALS shown in Table 9, "SANOL LS-770" (trade name, manufactured by Sankyo Lifetech Co., Ltd.) mentioned above was used.

Evaluation was carried out by the following methods.
<Compatibility Test>
"○": Neither haze nor bleed is observed.
"x": Haze or bleed is observed.
<Weather Resistance Test>

The test was carried out for 3,000 hours using a sunshine carbon weatherometer (manufactured by Suga test instruments Co., Ltd., "WEL-SUN-HC-B type" weather meter (black panel temperature: 63±3° C.; cycle of raining: 12 minutes and irradiation: 48 minutes)), and color difference (hereinafter, expressed as "ΔE") and molecular mass were measured, and the results were judged according to the following standard.
<ΔE>

Color difference was measured with spectroscopic color difference meter "SE2000" manufactured by Nippon Denshoku Industries Co., Ltd.
"⊚": 3 or less
"○": 3 or more and less tan 5
"Δ": 5 or more and less than 10
"x": 10 or more
<Retention of Molecular Mass>

From each test plate which had been subjected to the weather resistance test, 0.4 g of the plate was cut out in a vertical direction and put in a sample bottle. Then, 100 g of tetrahydrofuran (THF) was added to the bottle and kept overnight at a room temperature and used for molecular mass measurement. The same method mentioned above was used for the molecular mass measurement.

"○": 70% or more (Mw being 64,000 or more)
"x": less than 70 (Mw being less than 64,000)

TABLE 9

| | | Example | | | | Comparative Example | | | | | |
|---|---|---|---|---|---|---|---|---|---|---|---|
| | | 34 | 35 | 36 | 37 | 19 | 20 | 21 | 22 | 23 | 24 |
| Copolymer | Example 31 | 1 | — | — | 1 | — | — | — | — | — | — |
| | Example 32 | — | 1 | — | — | — | — | — | — | — | — |
| | Example 33 | — | — | 3 | — | — | — | — | — | — | — |
| | Comparative Example 15 | — | — | — | — | — | — | 2 | 0.4 | — | — |
| | Comparative Example 17 | — | — | — | — | — | — | — | — | 1 | 2 |
| | Total | 1 | 1 | 3 | 1 | 0 | 0 | 2 | 0.4 | 1 | 2 |
| Acrylic molding material | ACRYPET MD | 99 | 99 | 97 | 99 | 100 | 100 | 98 | 99.6 | 99 | 98 |
| Nonreactive HALS | Sanol 770 | — | — | — | 0.1 | — | 0.2 | — | — | — | — |
| | HALS content (part(s)) | 0.2 | 0.5 | 0.3 | 0.3 | 0 | 0.2 | 1.2 | 0.24 | 0.2 | 0.2 |
| Evaluation items | Compatibility | ○ | ○ | ○ | ○ | ○ | ○ | X | ○ | ○ | ○ |
| | ΔE | ○ | ⊚ | ○ | ⊚ | X | Δ | Δ | Δ | Δ | X |
| | Retention of molecular mass | ○ | ○ | ○ | ○ | X | X | ○ | X | X | X |

It is obvious from Tables 8 and 9 that the weather resistance improvers for thermoplastic resins of the present examples do not have odor and can realize conspicuous improvement in weather resistance for long time when they are added to thermoplastic resins, as well as they are excellent in polymerization stability.

Contrary to this, the water-based resin compositions of the Comparative Examples have a problem of odor and are not excellent in polymerization stability, and are insufficient in at least one characteristics of compatibility, capability for improving weather resistance, water resistance, coloring property and retention of molecular mass, even if they are polymerizable, when they are added to other thermoplastic resins as the weather resistance improvers for thermoplastic resins.

Use as a Weather Resistance Improver for Solvent-Based Paints

Examples 38 to 40

Comparative Examples 25 to 30

The thermoplastic resin compositions obtained in the Examples 31 to 33 and the Comparative Examples 15, 17 and 18 were used as a weather resistance improver for solvent-based paints and evaluation was carried out. The results are shown in Table 10.

Comparative Example 26 is an example in which a weather resistance improver for solvent-based paints or an ultraviolet light stabilizer is not compounded, and Comparative Example 26 is an example in which a nonreactive HALS ("SANOL LS-292" (trade name, manufactured by Sankyo Lifetech Co., Ltd.)) was used as an ultraviolet light stabilizer. Various evaluations were carried out according to the following methods.
<Preparation of a Clear Paint>

A weather resistance improver for solvent-based paints or an ultraviolet light stabilizer was compounded at the rate shown in Table 10 to "BR-106" (trade name, manufactured by Mitsubishi Rayon Co., Ltd.), and the resultant mixture was dissolved in toluene to obtain a solution with solid content of 45%. To 200 g of the resultant resin solution, 0.02 g of "KF-69" (trade name, manufactured by Kao Corporation) was added as a leveling agent, and the resultant resin solution was diluted with a thinner having a 50/50 of toluene/butyl acetate composition to have the viscosity of 15 seconds in terms of "Ford Cup 4", and filtrated using 300 mesh nylon screen to obtain a clear paint for evaluation. The clear paint thus obtained was coated on a steel plate treated with zinc phosphate treatment (steel plate treated with "Bondelite #100", thickness: 0.8 mm, 70 mm×150 mm) by spray coating to the extent that the thickness of the dried coating film became 50 μm, and kept at a room temperature for 1 hour and subjected to forced drying at 80° C. for 1 hour to obtain a coated plate for the tests of compatibility, water resistance, weather resistance and capability for improving weather resistance.

<Preparation of a White Enamel Paint>

A weather resistance improver for thermoplastic resins of each Example of 38 to 40 and each Comparative Example of 15, 17 and 18 was compounded at the rate shown in Table 10 to "BR-106" (trade name, manufactured by Mitsubishi Rayon Co., Ltd.), and the resultant mixture was dissolved in toluene to obtain a solution with solid content of 45%. To 200 g of the resultant resin solution, 0.02 g of "KF-69" (trade name, manufactured by Kao Corporation) as a leveling agent, 46.7 g of titanium oxide "CR-97" (trade name, manufactured by Ishihara Sangyo Kaisha, Ltd.) and 150 g of glass beads were added and dispersion of the pigment was carried out for 30 minutes using a high-speed disperser, and the resultant mixture was diluted with a thinner having a 50/50 of toluene/butyl acetate composition to have the viscosity of 15 seconds in terms of "Ford Cup #4", and then the glass beads and the like were filtrated with 300 mesh nylon screen to obtain an enamel paint for evaluation. The enamel paint thus obtained was coated on a steel plate treated with zinc phosphate treatment (steel plate treated with "Bondelite #100", thickness: 0.8 mm, 70 mm×150 mm) by spray coating to the extent that the thickness of the dried coating film became 50 μm, and kept at a room temperature for 1 hour and subjected to forced drying at 80° C. for 1 hour to obtain a coated plate for the tests of weather resistance, chalking and capability for improving weather resistance.

<Gardner Viscosity>

Viscosity of a resin solution was measured according to the Gardner type viscosity-measuring method described in JIS-K5600-2-2, 4, in which viscosity is obtained from an ascension rate of a bubble as compared with a standard viscosity tube.

<Gloss>

Gloss (unit: degree) was measured with a polarized light glossmeter "VG-2000" manufactured by Nippon Denshoku Industries Co., Ltd. Gloss of a sample before the test is shown in Table 8 as an initial gloss.

<Compatibility Test>

A glass plate was coated with a clear paint using a 8 mil applicator, and dried at a room temperature for 1 hour and subjected to forced drying at 80° C. for 1 hour to obtain a coated plate for evaluation of compatibility. The state of the coating film was checked by visual inspection and judged according to the following standard.

"○": No haze is observed.
"Δ": Haze is slightly observed.
"x": Conspicuous haze is observed.

<Water Resistance Test>

A glass plate was coated with a clear paint using a 8 mil applicator, and dried at a room temperature for 1 hour and subjected to forced drying at 80° C. for 1 hour to obtain a coated plate for evaluation of water resistance. Subsequently, the coated plate was soaked in water at a room temperature (about 20° C.) for 1 week. Whitening of the coating film right after the plate was taken out was checked by visual inspection and judged according to the following standard.

"○": Whitening is not observed.
"x": Whitening is observed.

<Weather Resistance Test>

The test was carried out with a test plate using a sunshine carbon weatherometer (manufactured by Suga test instruments Co., Ltd., "WEL-SUN-HC-B type" weather meter (black panel temperature: 63±3° C.; cycle of raining: 12 minutes and irradiation: 48 minutes)). Time at which gloss retention of the test plate became less than 70% was checked at every 500 hours in the first 2,000 hours and at every 1,000 hours from 2,000 hours, and was adopted as a retention time of weather resistance of the test plate sample, and the weather resistance of the test plate sample was judged according to the following standard.

"⊚": Retention time of weather resistance is 4,000 hours or more.
"○": Retention time of weather resistance is 3,000 hours or more and less than 4,000 hours.
"Δ": Retention time of weather resistance is 2,000 hours or more and less than 3,000 hours.
"x": Retention time of weather resistance is 1,500 hours or more and less than 2,000 hours.
"xx": Retention time of weather resistance is less than 1,500 hours.

<Chalking Test>

A state of chalking of a coating film after an accelerated test of 3,000 hours was checked by visual inspection and judged according to the following standard.

"○": No chalking is observed.
"Δ": Chalking is slightly observed.
"x": Conspicuous chalking is observed.

<Evaluation of Capability for Improving Weather Resistance>

Clear

"⊚": In the evaluation of weather resistance, weather resistance of a coating film of a clear paint which contains the weather resistance improver for solvent-based paints is improved by 4 stages or more as compared with a coating film which does not contain the one.
"○": In the evaluation of weather resistance, weather resistance of the coating film of a clear paint which contains the weather resistance improver for solvent-based paints is improved by 3 stages as compared with a coated film which does not contain the one.
"Δ": In the evaluation of weather resistance, weather resistance of the coating film of a clear paint which contains the weather resistance improver for solvent-based paints is improved by 2 stages as compared with a coated film which does not contain the one.
"x": Weather resistance of the coating film of a clear paint which contains the weather resistance improver for solvent-based paints is improved only by 1 stage or improvement of weather resistance is not observed.

Enamel

"⊚" In the evaluation of weather resistance, weather resistance of a coating film of a white enamel paint which contains the weather resistance improver for solvent-based paints is improved by 3 stages or more as compared with a coated film which does not contain the one.

"○": In the evaluation of weather resistance, weather resistance of the coating film of a white enamel paint which contains the weather resistance improver for solvent-based paints is improved by 2 stages as compared with a coated film which does not contain the one.

"Δ": In the evaluation of weather resistance, weather resistance of the coating film of a white enamel paint which contains the weather resistance improver for solvent-based paints is improved by 1 stage as compared with a coated film which does not contain the one.

"x" Weather resistance is not improved.

TABLE 10

| | | Example | | | Comparative Example | | | | | |
|---|---|---|---|---|---|---|---|---|---|---|
| | | 38 | 39 | 40 | 25 | 26 | 27 | 28 | 29 | 30 |
| Copolymer | Example 31 | 10 | — | — | — | — | — | — | — | — |
| | Example 32 | — | 5 | — | — | — | — | — | — | — |
| | Example 33 | — | — | 10 | — | — | — | — | — | — |
| | Comparative Example 15 | — | — | — | — | — | 4 | 1 | — | — |
| | Comparative Example 17 | — | — | — | — | — | — | — | 6 | — |
| | Comparative Example 18 | — | — | — | — | — | — | — | — | 10 |
| | Total | 10 | 5 | 10 | 0 | 0 | 4 | 1 | 6 | 10 |
| Base resin | BR-106 | 90 | 95 | 90 | 100 | 100 | 95 | 99 | 94 | 90 |
| Solvent | Toluene | 122 | 122 | 122 | 122 | 123 | 122 | 122 | 122 | 122 |
| Nonreactive HALS | Sonal 292 | — | — | — | — | 1 | — | — | — | — |
| Characteristic values of mixed resin | HALS content (part(s)) | 2 | 2.5 | 1 | 0 | 1 | 2.4 | 0.6 | 1.2 | 1 |
| | NV (% by mass) | 45 | 45 | 45 | 45 | 45 | 45 | 45 | 45 | 45 |
| | Gardner Viscosity | V | V | Z | V | V | V | V | V | V |
| Evaluation results of coating film | Clear Initial gloss | 81 | 81 | 83 | 82 | 80 | 68 | 77 | 80 | 80 |
| | Compatibility | ○ | ○ | ○ | ○ | ○ | X | ○ | ○ | ○ |
| | Water resistance | ○ | ○ | ○ | ○ | X | ○ | ○ | ○ | ○ |
| | Weather resistance | ⊚ | ⊚ | ○ | XX | X | Δ | X | ○ | X |
| | Capability for improving weather resistance | ⊚ | ⊚ | ○ | — | X | Δ | X | ○ | X |
| Enamel | Weather resistance | ○ | ⊚ | ○ | XX | X | Δ | X | ○ | X |
| | Chalking | ○ | ○ | ○ | X | X | Δ | X | ○ | X |
| | Capability for improving weather resistance | ⊚ | ⊚ | ⊚ | — | X | Δ | X | ⊚ | X |

It is obvious from Table 10 that the weather resistance improvers for solvent-based paints of the present Examples can realize conspicuous improvement in weather resistance for long time when they are added to other solvent-based paints, as well as they are excellent in polymerization stability.

Contrary to this, the resin compositions of the Comparative Examples are out of the specified compositional range of the present invention, and have a problem in polymerization stability, and are insufficient in at least one characteristics of compatibility, capability for improving weather resistance, water resistance and retention of molecular mass, even if they are polymerizable, when they are added to other solvent-based paints as the weather resistance improvers for solvent-based paints.

Consequently, it is obvious that the weather resistance improver for solvent-based paints of the present invention is excellent in polymerization stability and also useful as a weather resistance improver for solvent-based paints, which has conspicuous capability for improving weather resistance.

INDUSTRIAL APPLICABILITY

The water-based resin composition of the present invention can realize weather resistance for a long time as a water-based paint and can be used for a surface finish of various materials such as cement mortars, slate plates, plaster boards, extruded molded articles, foam concretes, metal, glass, ceramic tile, asphalt, wood, water resistant rubber, plastics and calcium-silicate base materials.

By adding a weather resistance improver of the present invention to a water-based paint, weather resistance of a coating film of the water-based paint can be improved for a long time.

Further, a resin composition obtained by recovering solid matter in the water-based resin composition of the present invention can be used effectively as a weather resistance improver for thermoplastic resins, which can improve a weather resistance for a long time, by adding to an acrylic resin, a vinyl chloride resin, a polyethylene resin, a polypropylene resin, a polystyrene resin, an ABS resin, a polyamide resin, a polyester resin, a polycarbonate resin or the like which is used for interiors or exteriors of automobiles, exterior building materials, films for agricultural application, coatings for electrical wire and the like.

Further, the resin composition obtained by recovering solid matter in the water-based resin composition of the present invention can also be used as a weather resistance improver for solvent-based paints, which can improve a weather resistance, by adding the resin composition to solvent-based paints which are used for surface finish of various materials.

What is claimed is:
1. A water-based resin composition comprising a copolymer (A) which is obtained by carrying out emulsion polymerization of unsaturated monomers comprising:
0.5 to 50 parts by mass of at least one ethylenically unsaturated monomer (a), represented by the following general formula (I), having a piperidyl group in a molecule and 50 to 99.5 parts by mass of at least one ethylenically unsaturated monomer (b), wherein ethylenically unsaturated monomer (b) does not substantially contain an ethylenically unsaturated monomer having a functional group represented by the following formula (II), (III), or (IV) in a molecule, with the total of the ethylenically unsaturated monomers (a) and (b) being 100 parts by mass, in the presence of 0.1 to 10 parts by mass of an emulsifier,

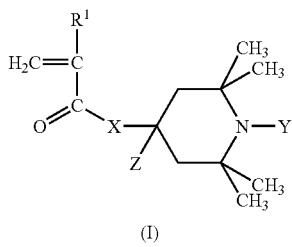

[Formula I]

(I)

wherein $R^1$ represents a hydrogen atom or an alkyl group having 1 to 2 carbon atoms, X represents an oxygen atom or an imino group, Y represents a hydrogen atom or an alkyl or alkoxyl group having 1 to 20 carbon atoms, and Z represents a hydrogen atom or a cyano group

—COOH  (II)

—SO$_3$H  (III)

—PO$_3$H  (IV).

2. The water-based resin composition according to claim 1, wherein the unsaturated monomers comprise 6 to 50 parts by mass of the at least one ethylenically unsaturated monomer (a) and 50 to 94 parts by mass of the at least one ethylenically unsaturated monomer (b).

3. The water-based resin composition according to claim 1, wherein the emulsifier is a reactive emulsifier comprising a radical polymerizable unsaturated double bond in its molecule.

4. The water-based resin composition according to claim 3, wherein the reactive emulsifier is a reactive anion emulsifier comprising a radical polymerizable unsaturated double bond in its molecule.

5. The water-based resin composition according to claim 1, wherein the mass average molecular mass of the copolymer (A) is 5,000 to 300,000.

6. The water-based resin composition according to claim 1, wherein the copolymer (A) is a copolymer obtained by carrying out emulsion polymerization of 100 parts of an unsaturated monomer mixture in the presence of 0.1 to 10 parts of a chain transfer agent.

7. The water-based resin composition according to claim 1, wherein minimum film forming temperature (MFT) of the water-based resin composition is 70° C. or below.

8. The water-based resin composition according to claim 1, wherein solid content of the water-based resin composition is 30 to 70% by mass.

9. A weather resistance improver for water-based paints comprising the water-based resin composition according to any one of claims 1 to 8.

10. A water-based paint comprising 1 to 50% by mass of the weather resistance improver for water-based paints according to claim 9 and 50 to 99% by mass of another water-based resin.

11. A water-based paint comprising the water-based resin composition according to any one of claims 1 to 8.

12. A resin composition obtained by recovering solid matter in the water-based resin composition according to any one of claims 1 to 8.

13. A weather resistance improver for thermoplastic resins comprising the resin composition according to claim 12.

14. A thermoplastic resin composition comprising the weather resistance improver for thermoplastic resins according to claim 13.

15. A weather resistance improver for solvent-based paints comprising the resin composition according to claim 12.

16. A solvent-based paint comprising the weather resistance improver for solvent-based paints according to claim 15.

\* \* \* \* \*